US010662308B2

(12) United States Patent
Guo et al.

(10) Patent No.: US 10,662,308 B2
(45) Date of Patent: May 26, 2020

(54) FLAME-RETARDANT THERMOPLASTIC MATERIAL AND EXPANDED BEADS THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL, Beijing (CN)

(72) Inventors: Peng Guo, Beijing (CN); Mingfu Lyu, Beijing (CN); Yaohui Xu, Beijing (CN); Shijun Zhang, Beijing (CN); Hui Quan, Beijing (CN); Kai Xu, Beijing (CN); Fuyong Bi, Beijing (CN); Wenbo Song, Beijing (CN)

(73) Assignees: China Petroleum & Chamical Corporation, Beijing (CN); Beijing Research Institute of Chemical Industry, China Petroleum & Chemical Corporation, Beijing (CN)

(*) Notice: Subject to any disclaimer, the term of this patent is extended or adjusted under 35 U.S.C. 154(b) by 70 days.

(21) Appl. No.: 15/581,379

(22) Filed: Apr. 28, 2017

(65) Prior Publication Data
US 2017/0313839 A1 Nov. 2, 2017

(30) Foreign Application Priority Data
Apr. 28, 2016 (CN) .......................... 2016 1 0274735

(51) Int. Cl.
*C08J 9/00* (2006.01)
*C08K 5/52* (2006.01)
(Continued)

(52) U.S. Cl.
CPC ........... *C08J 9/0038* (2013.01); *C08J 9/0061* (2013.01); *C08J 9/0066* (2013.01); *C08J 9/0076* (2013.01);
(Continued)

(58) Field of Classification Search
CPC .................. C08J 9/0038; C08J 9/16–20; C08J 2323/02–14; C08K 3/041; C08K 5/5397
See application file for complete search history.

(56) References Cited

U.S. PATENT DOCUMENTS 3,269,963 A    8/1966 Ilgemann et al.
3,660,350 A *  5/1972 Kushlefsky .......... C08K 5/0091
                                              252/609
(Continued)

OTHER PUBLICATIONS

Machine translation of JP 2005170963 by Matsuoka et al (Year: 2005).*

(Continued)

*Primary Examiner* — Michael M Dollinger
(74) *Attorney, Agent, or Firm* — Duane Morris LLP

(57) ABSTRACT

The invention relates to a flame-retardant thermoplastic material, comprising thermoplastic base resin, a flame retardant, and an optional antioxidant, wherein the flame retardant comprises a complex of phosphine oxide and a transition metal salt. The invention also relates to flame-retardant thermoplastic expanded beads. A foam molding prepared from the flame-retardant thermoplastic expanded beads has good flame-retardant and antistatic properties, has excellent mechanical properties and is widely used.

31 Claims, 4 Drawing Sheets

(51) Int. Cl.
*C08J 9/12* (2006.01)
*C08L 23/12* (2006.01)
*C08L 23/16* (2006.01)
*C08K 3/32* (2006.01)
*C09K 21/02* (2006.01)
*C09K 21/04* (2006.01)
*C09K 21/12* (2006.01)
*D01F 9/15* (2006.01)
*C08K 5/00* (2006.01)
*C08K 3/017* (2018.01)
*C08K 3/04* (2006.01)

(52) U.S. Cl.
CPC ........... *C08J 9/0085* (2013.01); *C08J 9/0095* (2013.01); *C08J 9/122* (2013.01); *C08K 3/32* (2013.01); *C08K 5/52* (2013.01); *C08L 23/12* (2013.01); *C08L 23/16* (2013.01); *C09K 21/02* (2013.01); *C09K 21/04* (2013.01); *C09K 21/12* (2013.01); *D01F 9/15* (2013.01); *C08J 2203/06* (2013.01); *C08J 2323/06* (2013.01); *C08J 2323/12* (2013.01); *C08J 2323/16* (2013.01); *C08J 2367/02* (2013.01); *C08J 2367/04* (2013.01); *C08J 2375/04* (2013.01); *C08J 2377/02* (2013.01); *C08K 3/017* (2018.01); *C08K 3/046* (2017.05); *C08K 5/0066* (2013.01); *C08K 2201/011* (2013.01); *C08K 2201/017* (2013.01); *C08L 2201/02* (2013.01); *C08L 2201/08* (2013.01); *C08L 2203/14* (2013.01); *C08L 2205/02* (2013.01); *D10B 2401/16* (2013.01)

(56) References Cited

U.S. PATENT DOCUMENTS

| | | | | |
|---|---|---|---|---|
| 3,962,177 | A * | 6/1976 | Dickens, Jr. | C08K 5/0066 524/148 |
| 4,259,229 | A * | 3/1981 | Nikitin | C08K 5/0091 524/709 |
| 5,234,962 | A * | 8/1993 | de Grave | C08J 9/18 521/143 |
| 2007/0125266 | A1 | 6/2007 | Ito | |
| 2009/0169895 | A1* | 7/2009 | Nohara | C08J 9/0061 428/407 |
| 2009/0181266 | A1* | 7/2009 | Park | B82Y 30/00 429/409 |
| 2011/0152435 | A1* | 6/2011 | Morishita | B82Y 30/00 524/504 |
| 2012/0107582 | A1* | 5/2012 | Metz | B82Y 30/00 428/209 |
| 2012/0132866 | A1* | 5/2012 | Nakamura | B82Y 30/00 252/511 |
| 2013/0221284 | A1 | 8/2013 | Hagiwara et al. | |
| 2013/0338246 | A1* | 12/2013 | Yoshida | C08K 13/02 521/93 |
| 2014/0171534 | A1* | 6/2014 | Fukuzawa | C08J 9/0038 521/143 |

OTHER PUBLICATIONS

European Search Report for EP Application No. 17168382.4 dated Oct. 6, 2017.

* cited by examiner

FLAME-RETARDANT THERMOPLASTIC MATERIAL AND EXPANDED BEADS THEREOF

FIELD OF THE INVENTION

The invention relates to the technical field of polymer materials, and more particularly relates to a flame-retardant thermoplastic material and expanded beads thereof.

BACKGROUND

The thermoplastic resin has the properties of softening when heated and hardening when cooled, and does not undergo a chemical reaction in the process, and the properties of softening when heated and hardening when cooled can be maintained through repeated heating and cooling processes. Among them, the characteristic temperature of the crystalline resin is the melting point, and the characteristic temperature of the non-crystalline resin is the glass transition temperature. The thermoplastic resin has the following characteristics: the thermoplastic resin is high-molecular-weight solid at room temperature, is a linear polymer or a polymer with a small amount of branched chains, has no intermolecular crosslinking, and attracts each other only by virtue of van der Waals force or hydrogen bonds. In the molding process, the resin is pressurized and heated to be softened and to flow, is not chemically crosslinked, can be shaped in the mold, and is then cooled and molded to get a product of a certain shape. In the repeated heating process, the molecular structure is basically not changed, but when the temperature is too high, and the time is too long, crosslinking, degradation or decomposition will occur.

The thermoplastic resin includes polyethylene (PE), polypropylene (PP), polybutylene (PB), polyester (polyethylene terephthalate (PET), polybutylene terephthalate (PBT)), polyvinyl chloride (PVC), polyvinyl alcohol (PVA), polystyrene (PS), polyamide (PA), polyoxymethylene (POM), polycarbonate (PC), polyphenylene oxide (PPO), polysulfone (PSF) and the like, and biodegradable resin such as polylactic acid (PLA), polybutylene succinate (PBS), polybutylene succinate-co-butylene terephthalate (PBST), polycaprolactone (PCL), polyhydroxyalkanoate (PHA), and the like.

With the development of society, in the automotive, aircraft, logistics, packaging and other industries, specific requirements have made for lightweighting, which meets the requirements of circular and green economy. Thermoplastics and the resulting foamed materials are the most important lightweight materials that not only play an important role in advancing the lightweight process, but also provide higher design freedom degree and differentiation. Lightweighting does not mean reducing the original safety and use performance of the materials. As long as the design, material selection and manufacturing processes are reasonable, lightweighting can meet the safety, vibration and noise standards and durability requirements, to ensure the use performance. For example, in the field of automotive manufacturing, in addition to the body, the automotive parts and interior and exterior trimming parts make a crucial contribution to achieving lightweighting, energy saving, safety, comfort and other goals, and the bumper cores, ceiling, interior trims and shading panels of the automotive, and even the automotive seats can be replaced with foamed thermoplastics.

Due to the characteristics of lightweight and good mechanical properties, and capability of being prepared into products of specific shapes through molding, expanded polypropylene (EPP) beads are a widely used polymer foamed material, and is the focus of national industrial and academic attention in the aspects of development and industrial production. The foam molding of EPP beads obtained by molding the EPP beads has excellent performance of chemical resistance, high toughness, high heat resistance, good compression resilience and the like as compared with foam moldings of expanded polystyrene-series resin beads. But the currently industrial EPP beads have the shortcomings of high molding temperature, poor flame retardancy and resistance to static electricity, poor low-temperature impact resistance and the like.

At first, the molding energy consumption is high. When the EPP beads undergo insert molding, in order to allow the expanded beads to melt in contact with each other at the same time as the expanded beads are secondarily foamed, it is necessary to use water vapor having higher saturated vapor pressure to heat. Therefore, it is necessary to use a high-pressure-resistance metal mold and a high-stamping special molding machine, which leads to an increase in energy cost, so it is very important to develop an EPP bead molding process with lower vapor pressure and lower temperature.

Secondly, the EPP beads are flammable. Polypropylene is a flammable substance, and emits more heat while burning, accompanied by droplets, and thus the flame is extremely easy to spread. In addition, the EPP beads have a cell structure, and thus have worse flame-retardant property. At present, most of the EPP beads cannot achieve flame retardant function, thus limiting the applications in the field with high flame-retardant requirement. Currently, flame-retardant PP is mainly produced by using a flame retardant compounded by halogen-containing organic compounds with antimony trioxide in the domestic market. The plastic products of the halogen-containing flame retardant will produce toxic and corrosive gases and a lot of smoke in the combustion, and great harm to the environment is caused. In recent years, many environmental assessment reports indicated that the halogen flame-retardant materials released benzofuran, dioxin and other highly toxic carcinogens in the processing, combustion and recycling processes, and generated serious harm to the environment and human health. In February of 2003, the EU firstly announced the ROHS (Restriction of Hazardous Substances) for limiting use of halogens, and Germany, the United States, Japan and China also published the relevant environmental laws and regulations. To guarantee that products and production lines meet the requirements of the existing and future environmental regulations, the global producers, suppliers and customers of electrical and electronic equipment make the safest requirements-"zero halogen" in the internal supply chain.

At present, the typically used polypropylene halogen-free flame retardants include hydroxide, phosphorus series, nitrogen series and a complex thereof. The typical hydroxide flame retardants are magnesium hydroxide and aluminum hydroxide, and polypropylene can reach the UL94 V0 flame-retardant level required by an insulating sheet when the addition amount is more than or equal to 60 wt %, but this leads to the difficulty in flame-retardant polypropylene processing. The typical phosphorus-series flame retardants are red phosphorus and organic phosphates, and the addition amount is lower than that of hydroxides, but the insulation level of polypropylene plates is reduced due to large water absorption rate and high permeability. The typical nitrogen-series flame retardants are melamines and triazines, but the product cannot achieve a high flame-retardant level when the thickness of the foam molding or plate is in the range of 0.125-0.75 mm. Therefore, the development of a low-smoke halogen-free environment-friendly flame-retardant PP composite material has very important practical significance.

Thirdly, the EPP beads have poor antistatic properties. When the molded EPP beads are used as relevant electronic material packages and liquid crystal panel turnover boxes, high antistatic performance is required. The common PP foamed material is poor in antistatic performance, and easily produces static charges in the friction with or stripping from the outside, and the charges are not easy to leak out and constantly accumulated on the surface. After the polypropylene surface is charged, polypropylene adsorbs the dust and dirt in the air if no effective surface treatment or antistatic treatment is carried out. When the human body is exposed to the electrostatic polypropylene, the human body feels electric shock, and static electricity can also cause the malfunction of electronic equipment, more seriously, the accumulation of static electricity will cause electrostatic attraction (or repulsion), electric shock or spark discharge phenomenon, and this will lead to a huge disaster in the flammable and explosive material environment. In order to avoid the influence of static electricity, the antistatic modification must be carried out on polypropylene to adapt to certain special occasions.

The addition of conductive functional bodies (such as conductive carbon black) or antistatic agents to a polymer matrix is one of main methods for preparing polymer-based antistatic composite materials. However, in general, the filling amount of the conductive filler or the addition amount of the antistatic agent required to form a conductive network is relatively large, resulting in a significant decrease in the mechanical properties and the like of the polymer, and the production cost and the process difficulty of the material are improved. Therefore, reducing the amount of the conductive filler is an important part of the development and application of antistatic composite materials. Chinese Patent Application 200510004023.0 describes the preparation of an antistatic polyolefin resin foam molding using a polymer antistatic agent, the obtained foam molding has intrinsic surface resistivity of $10^8$-$10^{13}\Omega$, and the used polymer antistatic agent mainly comprises a polyether-polypropylene block copolymer, a mixture of polyether ester amide and polyamide, and the like, but the antistatic agent is added in an amount of 4-6 wt %, is a short-acting antistatic agent, and is valid for only 30 days. Chinese Patent Application 200710192215.8 describes a preparation method of antistatic and anti-conductive polypropylene, the volume resistivity of the obtained polypropylene pellets is adjustable in the range of $10^{10}$-$10^{11}$ $\Omega \cdot cm$, and the addition amount of carbon black is 25-35 wt %; the carbon black has low apparent density, larger addition amount, and difficulty in blending with polypropylene base resin, thereby increasing the complexity of the process and product cost.

Most importantly, after the polypropylene beads are added with a flame retardant and a long-acting antistatic agent, the cell structure of the EPP beads and the mechanical properties of the foam molding are significantly affected, and the quality of the molded products obtained through subsequent molding is difficult to guarantee, thus limiting its application areas. When the flame retardant and the antistatic agent are both added, the decrease in the flame retardancy of the flame retardant or antistatic properties of the antistatic agent is often caused.

Fourthly, polypropylene, especially propylene homopolymer, is poor in low-temperature impact resistance. The impact polypropylene obtained by adding a rubber dispersion phase has excellent high- and low-temperature impact strength, high tensile strength, flexural modulus and rigidity and high heat resistance temperature, and is widely used in many fields such as molded or extruded automotive parts, household appliances, containers and household items. The expanded beads prepared from the impact polypropylene also have good resistance to low temperature, and especially have a wide prospect in cold chain transport packages, sports equipment, building insulation, and aerospace. The conventional general-grade impact polypropylene has the problems of combined cell breakage, low molding capability and the like due to low melt strength when used for preparing the expanded beads.

A common method for increasing the melt strength of polypropylene is to reduce the melt index, i.e., to increase the molecular weight of polypropylene, but this may lead to difficulty in melting and extruding the material. Another method is to widen the molecular weight distribution, for example, U.S. Pat. Nos. 7,365,136 and 6,875,826 describe a method for preparing homopolypropylene and random copolypropylene with wide molecular weight distribution and high melt strength, wherein alkoxysilane (such as dicyclopentyldimethoxysilane) is selected as an external electron donor, and the effect of increasing the melt strength of polypropylene is achieved by adjusting the hydrogen concentration in a plurality of serial reactors to regulate the size and distribution of the molecular weight. WO 9426794 discloses a method for preparing homopolypropylene and random polypropylene with high melt strength in a plurality of serial reactors, wherein polypropylene with high melt strength and wide molecular weight distribution or bimodal distribution is prepared by adjusting the hydrogen concentration in different reactors, and the property of the catalyst is not adjusted in each reactor, so the preparation process requires a lot of hydrogen. CN 102134290 and CN 102134291 disclose a method for preparation of homopolypropylene with wide molecular weight distribution and high melt strength, wherein a plurality of serial reactors are adopted, and homopolypropylene or random copolypropylene with wide molecular weight distribution and high melt strength is prepared by controlling the type and proportion of the external electron donor components at different reaction stages and then controlling the amount of the molecular weight regulator hydrogen. Chinese Patent Application 201210422726.5 also reports a preparation method of homopolypropylene or random copolypropylene with wide molecular weight distribution and high melt strength, wherein the isotactic index and hydrogen response of the catalyst between the different reactors are regulated by reasonable matching of two different types of external electron donors of silanes and diethers.

SUMMARY OF THE INVENTION

One object of the invention is to provide a flame-retardant thermoplastic material, comprising thermoplastic base resin and a flame-retardant component, and having good flame-retardant effect. The invention further provides a flame-retardant thermoplastic material comprising a long-acting antistatic agent, and the flame-retardant thermoplastic material has synergistic flame retardant and antistatic effects.

A second object of the invention is to provide flame-retardant thermoplastic expanded beads which can be prepared by the above-mentioned flame-retardant thermoplastic material by a foaming process and have the characteristics of regular cell morphology and appropriate expansion ratio, excellent high- and low-temperature impact resistance, antistatic property and flame retardancy, and simple processing process. According to the flame-retardant thermoplastic expanded beads and the preparation method thereof, the disadvantages that the existing thermoplastic resin has poor flame retardancy and antistatic property in the preparation of the thermoplastic expanded beads, and after the flame-retardant antistatic modification, the cell morphology and the expansion ratio of the thermoplastic expanded beads are difficult to control so as to affect the subsequent molding application are overcome.

In addition, the invention also provides methods for preparing the above-mentioned products.

One aspect of the invention provides a flame-retardant thermoplastic material comprising thermoplastic base resin, a flame retardant, and an optional antioxidant, wherein the flame retardant comprises a complex of phosphine oxide and a transition metal salt.

In a preferred embodiment, the flame retardant is free of halogen.

According to an embodiment of the invention, the flame retardant is a halogen-free flame retardant comprising a complex of phosphine oxide and a transition metal salt.

According to a preferred embodiment of the invention, the phosphine oxide has the following structural formula I:

Formula I wherein $R_1$, $R_2$ and $R_3$, identical or different, are independently selected from $C_1$-$C_{18}$ linear alkyl, $C_3$-$C_{18}$ branched alkyl, $C_1$-$C_{18}$ linear alkoxy, $C_3$-$C_{18}$ branched alkoxy, $C_6$-$C_{20}$ substituted or unsubstituted aryl, and $C_6$-$C_{20}$ substituted or unsubstituted aryloxy.

According to a preferred embodiment of the invention, $R_1$, $R_2$ and $R_3$ are independently selected from methyl, ethyl, propyl, $C_4$-$C_{18}$ linear or branched alkyl and $C_6$-$C_{20}$ substituted or unsubstituted aryl, more preferably from $C_4$-$C_{18}$ linear or branched alkyl and $C_6$-$C_{18}$ substituted or unsubstituted aryl.

Furthermore, the alkyl is preferably independently selected from $C_4$-$C_{12}$ linear or branched alkyl, more preferably $C_6$-$C_{12}$ linear or branched alkyl, and particularly preferably $C_6$-$C_{10}$ linear alkyl.

In some preferred embodiments, $R_1$, $R_2$ and $R_3$ are independently selected from $C_6$-$C_{18}$ alkyl having 6 or more carbon atoms in the main carbon chain, more preferably $C_6$-$C_{12}$ branched or linear alkyl having 6 or more carbon atoms in the main carbon chain.

In some preferred embodiments, $R_1$, $R_2$ and $R_3$ are independently selected from $C_6$-$C_{18}$ aryl having 1 or 2 carbon rings, more preferably substituted or unsubstituted phenyl.

According to the invention, the aryl may have a substituent such as hydroxyl or carboxyl.

According to a further preferred embodiment of the invention, $R_1$, $R_2$ and $R_3$ are the same substituents. The phosphine oxide having the structure has stronger complexing capability with the transition metal.

According to the invention, the phosphine oxide may be, for example, at least one of triphenylphosphine oxide, bis(4-hydroxyphenyl) phenylphosphine oxide, bis(4-carboxyphenyl) phenylphosphine oxide, tributylphosphine oxide, trihexylphosphine oxide, trioctylphosphine oxide, and tridecylphosphine oxide, more preferably at least one of triphenylphosphine oxide, trioctylphosphine oxide, trihexylphosphine oxide and tridecylphosphine oxide.

According to the flame retardant of the invention, the transition metal salt may be a transition metal organic salt and/or a transition metal inorganic salt, preferably at least one of nitrate, thiocyanate, formate, acetate and oxalate of a transition metal, and more preferably nitrate; and the transition metal is preferably a Group VIII metal element, more preferably cobalt and/or nickel. In particular, the transition metal salt is, for example, selected from at least one of cobalt acetate, nickel acetate, cobalt nitrate, nickel nitrate, nickel thiocyanate, cobalt thiocyanate, nickel nitrate and cobalt nitrate.

According to a preferred embodiment of the invention, the transition metal salt is cobalt nitrate and/or nickel nitrate. The two salts are more likely to form complexes with phosphine oxide and thus the yield is higher.

According to a preferred embodiment of the invention, the complex formed by the phosphine oxide and the transition metal salt has the following structural formula II:

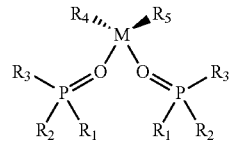

Formula II

In formula II, M is a transition metal. $R_1$, $R_2$ and $R_3$ are the same as those in formula I.

$R_4$ and $R_5$, identical or different, are independently selected from at least one of formate ion ($HCOO^-$), acetate ion ($CH_3COO^-$), oxalate ion ($C_2O_4H^-$), nitrate ion ($NO_3^-$) and thiocyanate ions ($SCN^-$), preferably nitrate ion and thiocyanate ion, more preferably nitrate ion.

According to the flame retardant of the invention, the preparation step of the complex comprises stirring and mixing 1-10 parts by weight, preferably 2-5 parts by weight of the phosphine oxide with 3-15 parts by weight, preferably 5-10 parts by weight of the transition metal salt in an organic solvent, followed by microwave heating and supercritical drying to obtain the complex, wherein the organic solvent is preferably selected from at least one of ethanol, acetone, pyridine, tetrahydrofuran and DMF.

The stirring speed may be, for example, 90-120 rpm, the microwave power is 35-55 W, the microwave heating temperature is 35-50° C., and the heating time is 3-4.5 hours.

In a preferred embodiment of the invention, the complex obtained after supercritical drying may be expressed as $M(CHO_2)_2(OPR_3)_2$, wherein M may be Ni or Co, and R may be phenyl, hexyl, octyl or decyl.

According to the flame-retardant thermoplastic material provided by the invention, based on 100 parts by weight of the thermoplastic base resin, the amount of the flame retardant is 5-50 parts by weight, preferably 10-20 parts by weight; optionally, the amount of the antioxidant is 0.1-0.5 part by weight, preferably 0.15-0.25 part by weight.

According to the flame-retardant thermoplastic material provided by the invention, the flame retardant further comprises an inorganic flame-retardant component, and the inorganic flame-retardant component is preferably selected from hydroxides of Group IIA and Group IIIA metals, more preferably from magnesium hydroxide and/or aluminum hydroxide. By adding the inorganic flame-retardant component, the flame-retardant effect can be further enhanced.

According to a preferred embodiment of the invention, the weight ratio of the complex to the inorganic flame-retardant component in the flame retardant is (1-5):1, preferably (2.5-3.5):1.

In a preferred embodiment, the flame retardant comprises: 1-10 parts by weight, preferably 2-5 parts by weight of phosphine oxide, 3-15 parts by weight, preferably 5-10 parts by weight of complex formed by the transition metal salt and 1-10 parts by weight, preferably 3-6 parts by weight of inorganic flame-retardant component.

When the inorganic flame-retardant component is contained, the flame retardant of the invention can be prepared by firstly preparing the complex and then physically mixing the complex with the inorganic flame-retardant component, wherein the physical mixing can be ball milling or mechanical mixing, preferably, mechanical stirring for homogenizing and the stirring speed is about 100 rpm.

The flame-retardant thermoplastic material provided by the invention is particularly suitable for the preparation of a thermoplastic foamed material or a foam molding thereof, and can be used in cooperation with the antistatic agent, so that the thermoplastic product meets the environmental protection requirements and the flame-retardant efficiency is improved.

According to the flame-retardant thermoplastic material provided by the invention, the thermoplastic material further comprises a carbon nanofiber antistatic agent (conductive filler).

Preferably, the weight ratio of the flame retardant to the carbon nanofiber antistatic agent is (3-20):1, more preferably (6-15):1.

In the flame-retardant thermoplastic material provided by the invention, the thermoplastic base resin is selected from at least one of polyolefin base resin, polylactic acid base resin, polyurethane base resin, polyester base resin and polyamide base resin; the thermoplastic base resin is preferably selected from at least one of polyethylene base resin, polypropylene base resin, polybutylene base resin, polylactic acid base resin, polyurethane base resin, polyethylene terephthalate base resin, polybutylene terephthalate base resin, polyamide 6 base resin and poly(butylene succinate) base resin, and more preferably polypropylene base resin.

According to a preferred embodiment of the invention, the polypropylene base resin comprises a propylene homopolymer component and a propylene-ethylene copolymer component, and the molecular weight distribution $M_w/M_n$ (weight average molecular weight/number average molecular weight) of the polypropylene base resin is less than or equal to 10 and greater than or equal to 4, preferably greater than 5 and less than 9; $M_{z+1}/M_w$ (Z+1 average molecular weight/weight average molecular weight) is greater than 10 and less than 20, preferably greater than 10 and less than 15; the content of room temperature xylene-soluble matters in the polypropylene material is greater than 10% by weight and less than 30% by weight, preferably greater than 10% by weight and less than 20% by weight; and the ratio of $M_w$ of room-temperature trichlorobenzene-soluble matters to $M_w$ of room-temperature trichlorobenzene-insoluble matters is greater than 0.4 and less than 1, preferably greater than 0.5 and less than 0.8. In the polypropylene base resin, the propylene homopolymer component as a continuous phase provides a certain rigidity for the polypropylene material, and the propylene-ethylene copolymer component as a rubber phase, i.e., a dispersion phase, can improve the toughness of the polypropylene material. However, the impact polypropylene with high melt strength is a material of a heterophasic structure comprising the continuous phase and the dispersion phase, the factors affecting the melt strength becomes more complicated. The inventors of the invention have found that the heterophasic polypropylene material having the above-mentioned component molecular weight relationship and molecular weight distribution characteristic has excellent rigidity and toughness while having high melt strength.

In the polypropylene base resin, the content of the rubber phase is measured at the content of room-temperature xylene-soluble matters. For the convenience of characterization, the molecular weight of the rubber phase is measured at the molecular weight of the trichlorobenzene-soluble matters. The composition of the rubber phase is characterized by the ethylene content in the xylene-soluble matters, preferably the ethylene content in the room-temperature xylene-soluble matters of the polypropylene base resin is less than 50% by weight and greater than 25% by weight, preferably greater than 30 by weight and less than 50% by weight. Herein, the "ethylene content in room-temperature xylene-soluble matters" means the weight content of the ethylene monomer component in the room-temperature xylene-soluble matters, is equivalent to the weight content of the ethylene monomer component in the rubber phase in the invention, and can be determined by the CRYSTEX method.

According to the invention, the content of the ethylene monomer unit in the polypropylene base resin is preferably 5-15% by weight. Herein, the content of the ethylene monomer unit in the polypropylene base resin means the weight content of the ethylene monomer component in the polypropylene copolymer.

According to the invention, preferably, the polypropylene base resin has a melt index of 0.1-15 g/10 min, preferably 0.1-6 g/10 min, as measured at 230° C. under a load of 2.16 kg.

The polydispersity index of relative molecular mass (PI) of the polypropylene base resin is preferably 4-8, more preferably 4.5-6.

In a preferred embodiment of the invention, the propylene homopolymer component at least comprises a first propylene homopolymer and a second propylene homopolymer; the first propylene homopolymer has a melt index of 0.001-0.4 g/10 min, as measured at 230° C. under a load of 2.16 kg; the propylene homopolymer component comprising the first propylene homopolymer and the second propylene homopolymer has a melt index of 0.1-15 g/10 min, as measured at 230° C. under a load of 2.16 kg; and the weight ratio of the first propylene homopolymer to the second propylene homopolymer is 40:60 to 60:40. By setting the propylene homopolymer component of the polypropylene base resin to be a combination of at least two propylene homopolymers having different melt indices (melt flow rate) and having a specific ratio, the polypropylene base resin used in the invention has a specific continuous phase, and in the further combination of the continuous phase and the dispersion phase rubber component, an impact polypropylene material having both high melt strength and good rigidity and toughness is produced.

In order to ensure that the polypropylene base resin has good rigidity and toughness balance, an ethylene-propylene random copolymer is adopted as the rubber component, and in the impact polypropylene base resin used in the invention, the weight ratio of the propylene-ethylene copolymer component to the propylene homopolymer component is (11-80):100, so that good effects on the melt strength and the impact resistance are achieved. Furthermore, preferably, the ratio of the melt index of the propylene homopolymer component to the melt index of the polypropylene base resin comprising the propylene homopolymer component and the propylene-ethylene copolymer component is greater than or equal to 0.6 and less than or equal to 1.

According to a preferred embodiment of the invention, the propylene homopolymer component constituting the impact polypropylene base resin used in the invention is characterized in that: the molecular weight distribution $M_w/M_n$ is 6-20, preferably 10-16; the content of the fraction with molecular weight greater than 5,000,000 is greater than or equal to 1.5% by weight and less than or equal to 5% by weight; the content of the fraction with molecular weight less than 50,000 is greater than or equal to 15% by weight and less than or equal to 40% by weight; $M_{z-1}/M_n$ is greater than or equal to 70, and preferably less than 150.

The polypropylene base resin provided and used in the invention is obtained by carrying out propylene homopolymerization reaction in the presence of a first propylene homopolymer to obtain a propylene homopolymer component comprising the first propylene homopolymer and a second propylene homopolymer, and then carrying out propylene-ethylene copolymerization reaction in the presence of the propylene homopolymer component to obtain a material comprising the propylene homopolymer component and the propylene-ethylene copolymer component. Thus, the impact polypropylene polypropylene base resin of the invention is not a simple mixture of the propylene homopolymer component and the propylene-ethylene copolymer component, but is an integral polypropylene material which comprises the propylene homopolymer and the propylene-ethylene copolymer and is obtained by further carrying out specific propylene-ethylene copolymerization reaction based on the specific propylene homopolymer component.

The polypropylene base resin used in the invention also has good heat resistance, and the melting peak temperature $T_m$ of the final polypropylene resin is 158° C. or more, as measured by DSC.

According to the invention, the preparation method of the impact polypropylene base resin with high melt strength comprises:

(1) first step: propylene homopolymerization reaction, including:
  ① first stage: carrying out propylene homopolymerization reaction in the presence or absence of hydrogen under the action of a Ziegler-Natta catalyst comprising a first external electron donor to obtain a reaction stream comprising a first propylene homopolymer;
  ② second stage: adding a second external electron donor to have complexing reaction with the catalyst in the reaction stream and then carrying out propylene homopolymerization reaction in the presence of the first propylene homopolymer and hydrogen to produce a second propylene homopolymer, thereby obtaining a propylene homopolymer component comprising the first propylene homopolymer and the second propylene homopolymer;
  wherein the melt indices of the first propylene homopolymer and the propylene homopolymer component comprising the first propylene homopolymer and the second propylene homopolymer are 0.001-0.4 g/10 min and 0.1-15 g/10 min, respectively, as measured at 230° C. under a load of 2.16 kg;

(2) second step: propylene-ethylene copolymerization reaction: carrying out propylene-ethylene copolymerization reaction in the presence of the propylene homopolymer component and hydrogen to produce a propylene-ethylene copolymer component, thereby obtaining the polypropylene base resin comprising the propylene homopolymer component and the propylene-ethylene copolymer component. The reaction stream also contains unreacted catalyst in the first step. According to the invention, the weight ratio of the first propylene homopolymer to the second propylene homopolymer is 40:60 to 60:40.

According to the invention, preferably, the ratio of the melt index of the propylene homopolymer component obtained in the first step to the melt index of the polypropylene resin comprising the propylene homopolymer component and the propylene-ethylene copolymer component obtained in the second step is greater than or equal to 0.6 and less than or equal to 1.

According to the invention, preferably, the weight ratio of the propylene-ethylene copolymer component to the propylene homopolymer component is 11-80:100.

In the first stage, the use amount of hydrogen may be, for example, 0-200 ppm.

In the second stage, the use amount of hydrogen is 2,000-20,000 ppm.

In the method provided by the invention, the used catalyst is the Ziegler-Natta catalyst, preferably a catalyst having high stereoselectivity. The Ziegler-Natta catalyst having high stereoselectivity refers to a catalyst that can be used to prepare the propylene homopolymer having an isotactic index greater than 95%. The catalyst generally comprises (1) a titanium-containing solid catalyst active component, mainly comprising magnesium, titanium, halogen and an internal electron donor; (2) an organoaluminum compound cocatalyst component; and (3) an external electron donor component.

The solid catalyst active component (also referred to as the main catalyst) in the Ziegler-Natta catalyst used in the method of the invention may be known in the art. Specific examples of such titanium-containing solid catalyst active component (1) which can be used are, for example, described in CN 85100997, CN 98126383.6, CN 98111780.5, CN 98126385.2, CN 93102795.0, CN 00109216.2, CN 99125566.6, CN 99125567.4 and CN 02100900.7. The entire contents of these patents are incorporated herein by reference.

The organoaluminum compound in the Ziegler-Natta catalyst used in the method of the invention is preferably an alkylaluminum compound, more preferably trialkylaluminum, such as at least one of triethylaluminum, triisobutylaluminum, tri-n-butylaluminum and trihexylaluminum and the like.

The molar ratio of the titanium-containing solid catalyst active component to the organoaluminum compound in the Ziegler-Natta catalyst used in the method of the invention, in terms of aluminum/titanium, is 10:1 to 500:1, preferably 25:1 to 100:1.

According to the invention, the first external electron donor is preferably selected from at least one of compounds with the general formula $R^1R^2Si(OR^3)_2$; wherein $R^2$ and $R^1$ are independently selected from $C_1$-$C_6$ linear or branched alkyl, $C_3$-$C_8$ cycloalkyl and $C_5$-$C_{12}$ heteroaryl, and $R^3$ is $C_1$-$C_3$ linear aliphatic group. Specific examples include, but are not limited to, methyl-cyclopentyl-dimethoxysilane, ethyl-cyclopentyl-dimethoxysilane, n-propyl-cyclopentyl-dimethoxysilane, bis(2-methylbutyl)-dimethoxysilane, bis(3-methylbutyl)-dimethoxysilane, 2-methylbutyl-3-methyl-butyl-dimethoxysilane, bis(2,2-dimethyl-propyl)-dimethoxysilane, 2-methylbutyl-2,2-dimethyl-propyldimethoxysilane, 3-methylbutyl-2,2-dimethyl-propyl-dimethoxysilane, dimethyldimethoxysilane, dimethyl-diethoxysilane, diisobutyl-dimethoxysilane, methyl-cyclohexyl-dimethoxysilane, methyl-isobutyl-dimethoxysilane, dicyclohexyl-dimethoxysilane, methyl-isopropyl-dimethoxysilane, isopropyl-cyclopentyl-dimethoxysilane, dicyclopentyl-dimethoxysilane, isopropyl-isobutyl-dimethoxysilane, diisopropyl-dimethoxysilane and the like.

The molar ratio of the organoaluminum compound to the first external electron donor, in terms of aluminum/silicon, is 1:1 to 100:1, preferably 10:1 to 60:1.

In the method according to the invention, the catalyst comprising the first external electron donor may be directly added to a homopolymerization reactor or may be added to the homopolymerization reactor after precontacting and/or prepolymerization commonly known in the art. The prepolymerization refers to prepolymerization of the catalyst at relatively lower temperature and a certain rate to obtain the desired particle morphology and kinetic behavior control. The prepolymerization may be a liquid-phase continuous bulk prepolymerization, or may be intermittent prepolymerization in the presence of an inert solvent. The prepolymerization temperature is usually −10-50° C., preferably 5-30° C. The precontacting step may optionally be provided before the prepolymerization process. The precontacting step refers to complexation reaction of the cocatalyst, the external electron donor and the main catalyst (solid active center component) in the catalyst system to obtain the catalyst system having polymerization activity. The temperature of the precontacting step is generally controlled at −10-50° C., preferably 5-30° C.

According to the invention, the second external electron donor is selected from at least one of the compounds represented by the chemical formulae (III), (IV) and (V);

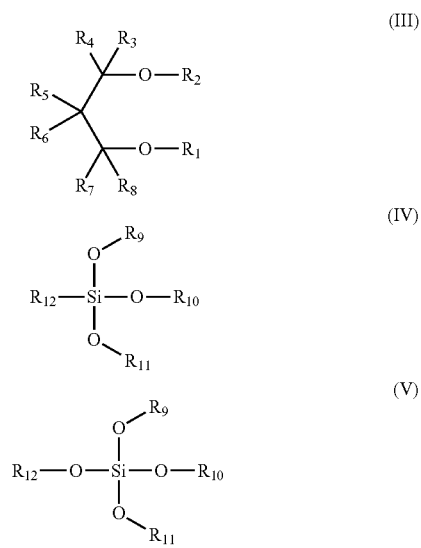

(III)

(IV)

(V)

Wherein $R_1$ and $R_2$ are independently selected from one of $C_1$-$C_{20}$ linear, branched or cyclic aliphatic groups, $R_3$, $R_4$, $R_5$, $R_6$, $R_7$ and $R_8$ are independently selected from one of hydrogen atom, halogen atom, $C_1$-$C_{20}$ linear or branched chain alkyl, $C_3$-$C_{20}$ cycloalkyl, $C_6$-$C_{20}$ aryl, $C_7$-$C_{20}$ alkaryl and $C_7$-$C_{20}$ aralkyl; $R_9$, $R_{10}$ and $R_{11}$ are independently $C_1$-$C_3$ linear aliphatic group, and $R_{12}$ is $C_1$-$C_6$ linear or branched alkyl or $C_3$-$C_8$ cycloalkyl. Specific examples of the second external electron donor include, but are not limited to, 2,2-diisobutyl-1,3-dimethoxypropane, 2,2-phenyl-1,3-dimethoxypropane, 2,2-benzylmethyl-1,3-dimethoxypropane, 2-isopropyl-2-isopentyl-1,3-dimethoxypropane, 2,2-bis(cyclohexylmethyl) 1,3-dimethoxypropane, 2-isopropyl-2,3,7-dimethyloctyl-dimethoxypropane, 2,2-isopropyl-1,3-dimethoxypropane, 2-isopropyl-2-cyclohexylmethyl-1,3-dimethoxypropane, 2,2-diisobutyl-1,3-diethoxypropane, 2,2-diisobutyl-1,3-dipropoxypropane, 2-isopropyl-2-isopentyl-1,3-diethoxypropane, 2-isopropyl-2-isopentyl-1,3-dipropoxypropane, 2,2-bis(cyclohexylmethyl)-1,3-diethoxypropane, n-propyltriethoxysilane, isopropyltriethoxysilane, isobutyltriethoxysilane, isobutyltrimethoxysilane, isobutyltripropoxysilane, isobutyltributoxysilane, t-butyltriethoxysilane, t-butyltripropoxysilane, t-butyltributoxysilane, cyclohexyltriethoxysilane, cyclohexyltripropoxysilane, tetraethoxysilane, tetramethoxysilane, tetrapropoxysilane, tetrabutoxysilane and the like.

The molar ratio of the organoaluminum compound to the second external electron donor, in terms of aluminum/silicon or aluminum/oxygen, is 1:1 to 60:1, preferably 5:1 to 30:1.

According to some embodiments of the invention, the molar ratio of the second external electron donor to the first external electron donor is 1-30, preferably 5-30.

In the method of the invention, preferably, the second external electron donor can be sufficiently contacted with the catalyst component in the reaction product of the first stage before the homopolymerization reaction of the second stage. In some preferred embodiments, the second external electron donor may be added to a feed line before the reactor in the second stage and after the reactor in the first stage or at the front end of the feed line of the reactor in the second stage, aiming at having precontacting reaction with the catalyst in the reaction product of the first stage before the reaction of the second stage.

Preferably, in the second step, ethylene is used in an amount of 20-50% based on total volume of ethylene and propylene. Preferably, in the second step, the ratio of volume of hydrogen to the total volume of ethylene and propylene is 0.02-1. Meanwhile, as described above, in the first stage, the use amount of hydrogen may be, for example, 0-200 ppm. In the second stage, the use amount of hydrogen may be 2,000-20,000 ppm. In the invention, it is important to control the composition, structure, or performance of the dispersion phase and the continuous phase in order to obtain the impact polypropylene base resin with high melt strength and high rigidity and toughness. According to the invention, the rubber phase having molecular weight distribution and ethylene content in favor of the purpose of the invention can be prepared under these preferred conditions, thereby obtaining the impact polypropylene base resin having better properties.

In a preferred embodiment of the invention, the yield ratio of the first propylene homopolymer to the second propylene homopolymer is 40:60 to 60:40. The yield ratio of the propylene-ethylene copolymer component to the propylene homopolymer component is 11-40:100.

The polymerization reaction of the first step may be carried out in liquid phase-liquid phase, or in gas phase-gas phase, or by a liquid-gas combined technique. In the liquid-phase polymerization, the polymerization temperature is 0-150° C., preferably 60-100° C., and the polymerization pressure should be higher than the saturated vapor pressure of propylene at the corresponding polymerization temperature. In the gas-phase polymerization, the polymerization temperature is 0-150° C., preferably 60-100° C., and the polymerization pressure may be atmospheric pressure or higher, preferably 1.0-3.0 MPa (gauge pressure, the same below).

The polymerization reaction of the second step is carried out in the gas phase. The gas phase reactor may be a gas phase fluidized bed, a gas phase moving bed or a gas phase stirred bed reactor. The polymerization temperature is 0-150° C., preferably 60-100° C. The polymerization pressure is below the liquefaction pressure of propylene at the partial pressure.

According to a preferred embodiment of the invention, in the first step, the reaction temperature in the first stage is 50-100° C., preferably 60-85° C.; the reaction temperature in the second stage is 55-100° C., preferably 60-85° C. In the second step, the reaction temperature is 55-100° C., preferably 60-85° C.

In a preferred embodiment of the invention, the method of the invention further comprises further modifying the resulting impact polypropylene base resin with an α or β crystal nucleating agent to further enhance the rigidity or toughness of the polypropylene resin material. The suitable α and β crystal nucleating agents for modification are the known technology in the art. The ratio of the weight of the nucleating agent to the total weight of the polypropylene is usually (0.005-3):100.

According to the method of the invention, the polymerization reaction may be carried out continuously or intermittently. Preferably, the method provided by the invention is carried out in two or more reactors operating in series.

According to the method of the invention, the homopolypropylene continuous phase having specific melt index, containing a large number of ultrahigh-molecular-weight components and having very wide molecular weight distribution can be prepared by preferably using two or more different types of external electron donors in a plurality of reactors connected in series, selecting suitable amounts of the external electron donors and adopting different amounts of chain transfer agent hydrogen in the reaction, wherein the molecular weight distribution $M_w/M_n$ of the homopolymer component is preferably 6-20; the content of the fraction with molecular weight greater than 5,000,000 is greater than or equal to 1.5% by weight and less than or equal to 5% by weight; the content of the fraction with molecular weight less than 50,000 is greater than or equal to 15.0% by weight and less than or equal to 40% by weight; $M_{z+1}/M_n$ greater than or equal to 70, and less than 150. On this basis, the copolymerization of propylene and ethylene is carried out to obtain the rubber phase dispersed in the continuous phase, and the composition and structure of the rubber phase are controlled by controlling the copolymerization reaction conditions, wherein the molecular weight distribution $M_w/M_n$ of the polypropylene base resin is preferably less than or equal to 10 and greater than or equal to 4; $M_{z+1}/M_w$ is greater than 10 and less than 20, preferably greater than 10 and less than 15; the content of the room-temperature xylene-soluble matters in the polypropylene base resin is greater than 10% by weight and less than 30% by weight; and the ratio of $M_w$ of the room-temperature trichlorobenzene-soluble matters to $M_w$ of the room-temperature trichlorobenzene-insoluble matters is greater than 0.4 and less than 1, preferably greater than 0.5 and less than 0.8. Finally, the impact polypropylene base resin having high melt strength is obtained.

In the method for preparing the impact polypropylene base resin of the invention, the added second external electron donor reacts with the catalytically active center in the homopolymerization product of the first stage to form a new catalytically active center, and the polymerization of propylene is further initiated in the second stage to obtain a homopolymer with great molecular weight difference from the product obtained in the first stage. The second external electron donor has higher hydrogen response than the first external electron donor, and a polymer with high melt index can be prepared in the presence of a small amount of hydrogen. Therefore, the homopolypropylene component containing a large amount of ultrahigh-molecular-weight fractions and having wide molecular weight distribution can be obtained in the case a small amount of hydrogen by adjusting the amount and the type of the external electron donor and the amount of hydrogen to be added to the two reactors connected in series or the intermittent operation at different stages without the use of a special catalyst. The propylene-ethylene copolymerization reaction is then further carried out on the basis of the homopolypropylene component by selecting appropriate ethylene/(ethylene and propylene), hydrogen/(ethylene and propylene) and the temperature and pressure to obtain the impact polypropylene containing certain content of rubber component with specific performance and having high melt strength. The composition and structural control of the rubber phase component ensures high melt strength, the specific content of the rubber component ensures high impact resistance, and the appropriate molecular weight distribution also endows the polymer with good processability. That is, the suitable continuous phase and the rubber dispersion phase and their combined relationship are obtained by setting a plurality of propylene homopolymerization stages and selecting appropriate reaction parameters and reaction conditions for each homopolymerization and copolymerization reaction, and the polypropylene base resin with excellent performance is obtained on this basis.

The impact polypropylene base resin with high melt strength, prepared and used in the invention, is described in Patent Application No. 2014106027987 entitled "Impact Polypropylene Material With High Melt Strength and Preparation Method Thereof", and the entire contents of which are incorporated herein by reference.

According to the flame-retardant thermoplastic material provided by the invention, the carbon nanofiber antistatic agent contains 1-5 wt %, such as 2-4 wt %, of the transition metal (e.g., nickel or cobalt). This part of the transition metal may be derived from the catalyst used in the preparation of the carbon nanofiber antistatic agent. Advantageously, the used carbon nanofibers are directly used in the preparation of the flame-retardant thermoplastic material without removing the transition metal catalyst therein. Due to the presence of the transition metal and other potential reasons, the carbon nanofibers used in the invention can have synergistic effects with the flame retardant to facilitate the formation of a dense carbon layer that blocks the flame and the material, thereby reducing the addition amount of the flame retardant, and the combination with the flame retardant does not negatively affect each other to cause performance decrease, and the subsequent foaming process and the cell structure and physical properties are not affected.

According to the invention, there is no particular requirement for the purity, aspect ratio, diameter and morphology of the carbon nanofibers.

The preparation method of the carbon nanofibers suitable for use in the invention comprises subjecting a carbon source to acid treatment, then forming a complex with the transition metal catalyst and subjecting the complex to carbonization treatment.

The exemplary preparation method of the carbon nanofibers comprises:

(1) the carbon source is pretreated with a mixed acid treatment method using phosphoric acid, nitric acid and hydrochloric acid (volume ratio 1:1:1) or a grinding treatment method to obtain a pretreated material;

Wherein the carbon source is a carbon source in the condensed state and may be at least one of carbon pitch, petroleum pitch, coal tar pitch, coal tar, natural graphite, artificial graphite, bamboo charcoal, carbon black, activated carbon and graphene, preferably the carbon source with carbon content of 80 wt % or more, such as at least one of coal tar pitch, petroleum pitch and bamboo charcoal having the carbon content of 80 wt % or more;

2) complexing: the pretreated material and the metal catalyst are complexed to get the complex;

Wherein the metal catalyst is preferably sulfate, nitrate, acetate or a menthyl compound of the transition metal, and the transition metal is preferably a Group VIII metal element such as Fe, Co or Ni, or Cr;

The mass percentage ratio of the transition metal atom to the carbon source in the metal catalyst is (35-70):100;

Considering that the presence of nitrogen in the catalyst facilitates synergism to promote the flame-retardant effect, the metal catalyst is preferably cobalt nitrate and/or nickel nitrate;

(3) carbonization treatment: the complex undergoes carbonization reaction at 800-1200° C. under high-purity nitrogen, kept at constant temperature for 0.5-5 hours, and cooled to room temperature to get self-assembled carbon fibers, wherein the temperature of the carbonization treatment is preferably 950-1150° C. and the constant-temperature reaction time is 1.5-2.5 hours; and removal of the metal impurities by post-treatment is not needed.

Compared with the short-acting antistatic agent, such as a polymer antistatic agent, which is commonly used in the prior art, the carbon nanofibers used in the invention are a long-acting antistatic agent capable of providing long-acting antistatic effect.

The invention also provides the application of the flame-retardant thermoplastic material (e.g., a polypropylene composition) according to the invention in expanded beads, in particular in the preparation of expanded polypropylene beads.

In addition, the flame-retardant thermoplastic material may also contain other additives which are conventionally used in the thermoplastic resin in the prior art without adversely affecting the extrusion performance, flame resistance, antistatic property and mechanical properties of the thermoplastic material provided by the invention. The other additives include, but are not limited to, slipping agents and anti-blocking agents. In addition, the amounts of the other additives may be conventional in the art, as understood by those skilled in the art.

The flame-retardant thermoplastic material may be prepared according to various existing methods, for example, by directly mechanically mixing impact thermoplastic resin with high melt strength, the flame retardant, the carbon nanofiber antistatic agent and optional antioxidant, lubricant and other additives in a mechanical mixing apparatus according to the ratio and then carrying out melt blending and granulation at 170-200° C. in a melt blending apparatus. Alternatively, the flame-retardant thermoplastic material may be prepared by blending a small amount of thermoplastic resin with high melt strength with the flame retardant and the conductive filler, i.e., the carbon nanofiber antistatic agent in a concentrating manner at 170-210° C. to obtain flame-retardant masterbatches and antistatic masterbatches, then blending the two masterbatches and the impact thermoplastic resin with high melt strength in proportion, and granulating at 170-200° C. Herein, the mechanical mixing apparatus may be, for example, a high speed mixer, a kneader, or the like. The melt blending apparatus may be, for example, a twin-screw extruder, a single-screw extruder, an open mill, an internal mixer, a buss kneader, or the like.

The high-performance halogen-free flame-retardant thermoplastic material provided by the invention has excellent mechanical strength, processing performance, qualified optical properties and excellent antistatic properties. The performances of the high-performance halogen-free flame-retardant thermoplastic material are as follows: the notched impact strength of the simply supported beam is more than or equal to 15 MPa, preferably more than or equal to 25 MPa; the oxygen index is more than or equal to 25, preferably more than or equal to 28. In addition, the surface resistivity of the antistatic film raw sheet prepared from the flame-retardant thermoplastic material of the invention is $10^7$-$10^9\Omega$, preferably $10^8$-$10^9\Omega$.

According to a second aspect of the invention, the flame-retardant thermoplastic expanded beads are provided and prepared by carrying out an impregnation foaming process on 100 parts by weight of the flame-retardant thermoplastic material as described in the first aspect of the invention and 0.001-1 part by weight, preferably 0.01-0.1 part by weight, more preferably 0.01-0.05 part by weight of the cell nucleating agent.

The invention also provides a method for preparing the flame-retardant thermoplastic expanded beads, comprising the steps of:

mixing the flame-retardant thermoplastic material with at least one of optional surfactant, dispersion medium and dispersion enhancer in an autoclave to obtain a dispersion; and feeding a blowing agent into the autoclave, and adjusting the temperature and pressure to the foaming temperature and the foaming pressure, respectively, and carrying out foaming reaction while stirring; and collecting the expanded beads.

The cell nucleating agent may be inorganic powder, such as at least one of zinc borate, silica, talc, calcium carbonate, borax and aluminum hydroxide, preferably zinc borate. The cell nucleating agent may be added in the preparation of the flame-retardant antistatic polypropylene composition in view of reducing the use amount of the antioxidant.

According to the flame-retardant thermoplastic expanded beads provided by the invention and the preparation process thereof, when the flame retardant and the antistatic agent are used together in the flame-retardant thermoplastic material, they can also function as a part of the cell nucleating agent, and thus the amount of the subsequently added cell nucleating agent can be reduced so that the influence on the cell morphology of the expanded beads is reduced as much as possible.

According to the invention, a reactor impregnation method is used for the foaming of micropellets, which requires the addition of the dispersion medium, preferably at least one of additives such as the surfactant, dispersant and dispersion enhancer, and the addition of the blowing agent.

Any components in which the micropellets of the flame-retardant thermoplastic material are dispersed but not dissolved can be used as the dispersion medium. The dispersion medium may be water, ethylene glycol, glycerol, methanol, ethanol or a mixture thereof, preferably a water-based dispersion medium, more preferably water, most preferably deionized water. The dispersion medium was used in an amount of 1-4 L, preferably 2.5-3.5 L, relative to the volume 5 L of the reactor.

In order to promote the dispersion of the micropellets in the dispersion medium, it is preferable to use a surfactant, which may be at least one of stearic acid, sodium dodecylbenzene sulfonate, quaternary ammonium salt, lecithin, amino acid, betaine, fatty acid glyceride, fatty acid sorbitan and polysorbate, preferably an anionic surfactant sodium dodecylbenzene sulfonate. The surfactant is generally used in an amount of 0.001-1 part by weight, preferably 0.01-0.5 part by weight, preferably 0.1-0.3 part by weight, relative to 100 parts by weight of the flame-retardant polyolefin composition micropellets.

In order to prevent the melt bonding of the micropellets of the flame-retardant thermoplastic material during the foaming step, it is desirable to add the dispersant which is a fine organic or inorganic solid to the dispersion medium. For ease of operation, it is preferred to use inorganic powder. The dispersant may be a natural or synthetic clay mineral (e.g., kaolin, mica, magnesium aluminum garnet and clay), alumina, titanium dioxide, basic magnesium carbonate, basic zinc carbonate, calcium carbonate, silica, zinc borate and iron oxide, preferably kaolin. The dispersant is generally used in an amount of 0.01-5 parts by weight, preferably 0.1-3 parts by weight, preferably 0.5-2 parts by weight, relative to 100 parts by weight of the flame-retardant polyolefin composition micropellets.

It is possible to add a dispersing enhancer to the dispersion medium in order to improve the dispersing efficiency of the dispersant, that is, to reduce the amount of the dispersant while retaining its function of preventing the melt bonding of the micropellets. The dispersion enhancer is an inorganic compound having solubility of about 1 mg in 100 mL of water at 40° C. and providing a divalent or trivalent anion or cation. Examples of the dispersing enhancer include magnesium chloride, magnesium nitrate, magnesium sulfate, aluminum chloride, aluminum nitrate, aluminum sulfate, iron chloride, iron sulfate and iron nitrate, preferably aluminum sulfate. The use of the dispersion enhancer favors obtaining EPP beads having apparent density of 100 g/L or more. The amount of the used dispersion enhancer is generally 0.0001-1 part by weight, preferably 0.01-0.1 part by weight, relative to 100 parts by weight of the thermoplastic material micropellets.

The blowing agent suitable for use in the invention may be an organic physical blowing agent or an inorganic physical blowing agent. The organic physical blowing agent includes aliphatic hydrocarbons such as propane, butane, pentane, hexane and heptane, alicyclic hydrocarbons such as cyclobutane and cyclohexane, and halogenated hydrocarbons such as chlorofluoromethane, trifluoromethane, 1,2-difluoroethane, 1,2,2,2-tetrafluoroethane, methyl chloride, ethyl chloride and dichloromethane. Examples of the inorganic physical blowing agent include air, nitrogen, carbon dioxide, oxygen and water. The water as the blowing agent may be water for dispersing the polyolefin resin micropellets in the dispersion medium. These organic and inorganic blowing agents may be used singly or in combination of two or more. Due to the stability (homogeneity) of apparent density, low cost and environment friendliness of the EPP beads, carbon dioxide and nitrogen are preferably adopted as the blowing agent.

The amount of the blowing agent may be conventionally determined in accordance with the type of the blowing agent, the foaming temperature, and the apparent density of the EPP beads to be produced. When the nitrogen is used as the blowing agent and the water is used as the dispersion medium, the pressure in the closed container when the foaming device is subjected to pressure relief, that is, the pressure (gauge pressure) in the upper space inside the closed container is in the range of 1-12 MPa; when carbon dioxide is used as the blowing agent, the gauge pressure is in the range of 1-7 MPa. In general, the pressure in the upper space inside the closed container is desirably increased as the decrease in the apparent density of the thermoplastic expanded beads to be obtained.

The method for preparing the flame-retardant thermoplastic expanded beads provided by the present invention may comprise subjecting the components in the amounts to melt blending and underwater pelletization, and carrying out impregnation foaming in the autoclave to obtain the flame-retardant thermoplastic expanded beads. Herein, the melt blending and granulation process of the raw materials may comprise: raw materials for preparing the flame-retardant thermoplastic material, including the flame retardant, long-acting antistatic agent, thermoplastic resin and the like, and the cell nucleating agent, antioxidant and optional slipping agent, binding agent and the like are blended in the high-speed stirrer, extruded through one or more dies of the twin-screw or single-screw extruder into wires and cut to obtain the flame-retardant thermoplastic material micropellets containing the antistatic agent. It is preferable that micropellets are cut in water at 75° C. or less, preferably 70° C. or less, more preferably 55-65° C. by using an underwater micropellet granulation system to obtain thermoplastic resin micropellets. Preferably, the length/diameter ratio of each particle is 0.5-2.0, preferably 0.8-1.3, more preferably 0.9-1.1, and the average weight is 0.1-20 mg, preferably 0.2-10 mg, more preferably 1-3 mg. The average weight is the average of the weights of 200 randomly selected micropellets.

According to an embodiment of the invention, the foaming step is carried out by reactor impregnation foaming, comprising the following specific steps:

(1) in the autoclave, mixing the flame-retardant thermoplastic material micropellets, the dispersion medium, the surfactant, the dispersant, the dispersion enhancer and other additives;

(2) discharging the residual air from the reactor by using the inert blowing agent and covering the reactor with the cover after the air in the reactor is removed; feeding the inert blowing agent into the autoclave, and initially adjusting the pressure until it is stable, wherein the blowing agent is carbon dioxide and/or nitrogen, preferably carbon dioxide; then stirring the dispersion in the autoclave at a stirring speed of 50-150 rpm, preferably 90-110 rpm;

(3) adjusting the pressure in the reactor to the required pressure for foaming, which is 1-10 MPa, preferably 3-5 MPa (gauge pressure); raising the temperature to the foaming temperature at an average heating rate of 0.1° C./min, wherein the foaming temperature is 80-220° C.; and continuously stirring for 0.1-2 hours, preferably 0.25-0.5 hour, under the foaming temperature and pressure conditions;

(4) opening the outlet of the autoclave to discharge the materials in the reactor into the collection tank to obtain thermoplastic expanded beads, and feeding carbon dioxide while discharging so that the pressure in the autoclave is maintained near the foaming pressure before all the foam moldings are completely foamed and enter into the collection tank.

According to a preferred embodiment of the invention, the flame-retardant thermoplastic expanded beads do not contain halogen elements.

According to a third aspect of the invention, a foam molding prepared from the expanded beads according to the second aspect of the invention is provided and has surface resistivity of $1.0*10^7 \Omega$ to $1.0*10^9 \Omega$, preferably $1.0*10^8 \Omega$ to $9.9*10^8 \Omega$, and limiting oxygen index of 20-40 (the test criteria is mentioned below). The compression strength of the foam molding is preferably 170-600 kPa, which is measured by the US ASTM D3575-08 and is the compression strength when compressed by 50% at a compression rate of 10 mm/min.

In addition, the invention also provides the application of the expanded beads or foam molding thereof prepared according to the invention in automotive parts, medical devices, electronic packages, household goods, cryogenic cold chain packages, sports equipment, building insulation and aerospace.

The term "base resin" as used herein means pure resin, i.e., resin that does not form a composition.

The term "halogen-free" as used in the invention means that the compound or mixture or composition contains no halogen.

The "complex" that is formed by the phosphine oxide and the transition metal salt has the molecular structure as shown in formula (II) in the present invention is refer to a coordination complex, also called a "coordination compound" or "metal complex", a structure consisting of a central atom or ion or molecule weakly connected to surrounding atoms or molecules (ligands).

The term "composite flame retardant" as used in the present invention means that a flame retardant that is made from several different flame retardants or flame retardant substances.

The words "a", "one", "the" and "said" are intended to mean the presence of one or more elements when explaining or describing the elements of the invention. The terms "comprise", "contain", "include" and "have" are intended to be inclusive, meaning that additional elements other than the listed elements may exist.

The terms "about", "approximately", "basically" and "mainly" as used herein, when used in conjunction with the ranges of the elements, concentrations, temperatures, or other physical or chemical properties or characteristics, include the changes that may exist in the upper and/or lower limits of the ranges of the properties or characteristics, for example, changes caused by rounding, measurement methods, or other statistical changes. As described herein, the values associated with amount, weight and the like, defined as "about", are ±1% of all values for each particular value. For example, the term "about 10%" should be understood as "9%-11%".

Compared with the prior art, the following beneficial effects are achieved.

The invention provides the flame-retardant thermoplastic material which has a good flame-retardant effect by using the impact thermoplastic resin with high melt strength as the base resin and the complex formed by the phosphine oxide and the transition metal salt as the flame retardant. The flame-retardant thermoplastic material containing the antistatic agent is obtained by further adding the special antistatic agent (i.e., the long-acting antistatic agent). The flame retardant and the long-acting antistatic agent in the flame-retardant thermoplastic material can play a synergistic effect, thereby effectively improving the flame-retardant efficiency of the thermoplastic material, improving the flame-retardant effect, reducing the addition amount of the flame retardant, and having no negative impact on the antistatic performance. The flame-retardant thermoplastic expanded beads are prepared from the flame-retardant thermoplastic material by using a reactor method. The expanded beads have the characteristics of excellent high- and low-temperature impact resistance, static resistance and flame retardancy, high porosity, controllable density, easiness in shaping and so on. The manufacturing process is simple, energy-saving and environment-friendly.

In addition, the flame-retardant thermoplastic expanded beads provided by the invention have the advantages of low cost, dense cells and uniform pore size distribution, can be applied to the automotive parts, food and electronic packages, building decoration and other occasions with high requirements for the lightweighting of the plastic foam molding, as well as are suitable for medical equipment, household goods, low temperature cold chain packages, sports equipment, aerospace and other excellent materials in the fields with comprehensive requirements for flame retardancy, static resistance and low-temperature impact resistance.

The flame-retardant thermoplastic expanded beads prepared by the invention are non-crosslinked structures and can be recycled according to the method for recycling the general thermoplastic materials without causing secondary pollution and conforming to the requirements of circular economy.

DESCRIPTION OF DRAWINGS

The invention is further described in detail with reference to the drawings, in which like parts are designated by like reference numerals.

EMBODIMENTS

Figure 1:
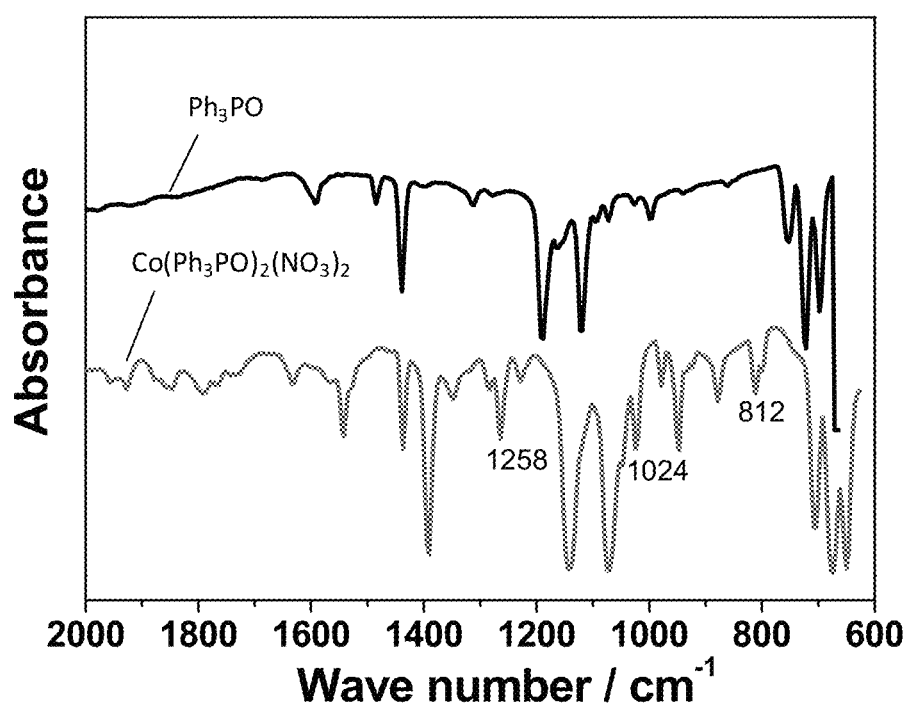
FIG. 1 shows the infrared spectra of triphenylphosphine oxide and complex $Co(OPPh_3)_2(NO_3)_2$.

The invention is further described with reference to the following examples, but it is noted that the invention is not limited to these examples.

The raw materials in the following Examples and Comparative Examples are shown below.

Ordinary polypropylene base resin: Qilu Company of China Petroleum & Chemical Corporation, Trademark EPS30R;

Polyethylene base resin: Yangzi Petrochemical Company Limited of China Petroleum & Chemical Corporation, Trademark 7042;

Polyethylene base resin: Yanshan Company of China Petroleum & Chemical Corporation, Trademark LD100ac;

Polyethylene base resin: Beijing Research Institute of Chemical Industry of China Petroleum & Chemical Corporation, Trademark HPE1, HPE2;

Polylactic acid base resin: Natureworks;

TPU base resin: BASF;

PBT base resin: ChiMei Chemical Corporation;

PET base resin: Japan Toray;

PA 6 base resin: BASF;

PBS base resin: Beijing Research Institute of Chemical Industry of China Petroleum & Chemical Corporation;

Kaolin: J&K Scientific Ltd., ACROS, Analytical purity;

Triphenylphosphine oxide: J&K Scientific Ltd., ACROS, Analytical purity;

Cobalt nitrate: J&K Scientific Ltd., ACROS, Analytical purity;

Nickel nitrate: J&K Scientific Ltd., ACROS, Analytical purity;

Coal tar pitch: Shanxi Institute of Coal Chemistry, Chinese Academy of Sciences, Carbon content of higher than 80 wt %, Industrial grade;

Petroleum pitch: Sinopec, Carbon content of higher than 80 wt %, Industrial grade;

Bamboo charcoal: Shanxi Institute of Coal Chemistry, Chinese Academy of Sciences, Carbon content of higher than 80 wt %, Industrial grade;

Magnesium hydroxide: J&K Scientific Ltd., ACROS, Analytical purity;

Aluminum hydroxide: J&K Scientific Ltd., ACROS, Analytical purity;

Ethanol: J&K Scientific Ltd., ACROS, Analytical purity;

Sodium dodecylbenzene sulfonate: Tianjin Guangfu Fine Chemical Research Institute, Analytical purity;

Aluminum sulfate: Tianjin Guangfu Technology Development Co., Ltd., Analytical purity;

Zinc borate: Tianjin Guangfu Fine Chemical Research Institute, Analytical purity;

Carbon nanofibers: Shanxi Institute of Coal Chemistry, Chinese Academy of Sciences, Purity greater than 80 wt %, Industrial grade;

Antistatic agent Atmer129: Croda Company, Industrial grade;

Trioctylphosphine oxide, trihexylphosphine oxide, tridecylphosphine oxide, tributyl phosphate and dibutyl butylphosphate are all prepared by conventionally known preparation methods.

Other used raw materials are commercially available.

The production and test apparatus and equipment used in the Examples and Comparative Examples are shown below.

Underwater granulation system: Labline 1000, Germany BKG Company;

Melt Tensile Tester: Rheotens71.97, Germany Goettfert Company;

Density Tester: CPA225D, Density Accessories YDK01, Germany Satorius Company;

Molding Machine: Germany Kurtz Ersa Company Kurtz T-Line;

Universal material testing machine: 5967, the US Instron Corporation;

Oxygen Index Instrument: 6448, Italy ceast Company;

Cone calorimeter: FTT200, British FTT Company;

Surface resistance meter: 4339B, the US Agilent company.

The polymer-related data in the examples were obtained according to the following test methods.

(1) the content of the room-temperature xylene-soluble matters and the ethylene content in the room-temperature xylene-soluble matters (i.e., the content of the rubber phase and the ethylene content of the rubber phase) were measured by the CRYSTEX method using CRYST-EX (CRYST-EX EQUIPMENT, IR4+detector) manufactured by Spain Polymer Char Company, a series of samples with different content of the room-temperature xylene-soluble matters were selected as standard samples for calibration, and the content of the room-temperature xylene-soluble matters in the standard samples was measured by ASTM D5492. The infrared detector provided by the instrument itself can test the weight content of propylene in the soluble matters, which is used to characterize the ethylene content in the room-temperature xylene-soluble matters (ethylene content in the rubber phase) by substracting the weight content of propylene from 100%.

(2) the tensile strength of the resin was measured according to the method described in GB/T 1040.2 (ISO 527).

(3) the melt mass flow rate MFR (also known as melt index) was measured at 230° C. under a load of 2.16 kg using the 7026 Melt Indexer from the CEAST Company according to the method described in ASTM D1238.

(4) the flexural modulus was measured according to the method described in GB/T 9341 (ISO178).

(5) the notched impact strength of simply supported beam was measured according to the method described in GB/T 1043.1 (ISO179).

(6) the ethylene content was measured by an infrared spectroscopy (IR) method, in which the standard sample measured by a nuclear magnetic resonance method was used for calibrating. In the nuclear magnetic resonance method, an AVANCE III 400 MHz nuclear magnetic resonance (NMR) spectrometer from Swiss Bruker Company and a 10 mm probe were adopted for measuring. The solvent was deuterated o-dichlorobenzene, and about 250 mg of the sample was placed in 2.5 ml of deuterated solvent and dissolved by heating in a 140° C. oil bath to form a homogeneous solution. $^{13}$C-NMR was collected, the probe temperature was 125° C., 90° pulse was adopted, the sampling time AQ was 5 seconds, the delay time D1 was 10 seconds, and the scanning frequency was more than or equal to 5000 times. Other operations, peak identification and the like were implemented according to the commonly used NMR experimental requirements.

(7) polydispersity index of relative molecular weight (PI): a resin sample was molded into a 2 mm sheet at 200° C. and subjected to dynamic frequency scanning at 190° C. under the protection of nitrogen by using an ARES (Advanced Rheometer Extension System) rheometer from the USA Rheometric Scientific Inc. The parallel plate clamps were adopted, and the appropriate strain amplitude was determined to ensure that the experiment was carried out in the linear region. The changes of the energy storage modulus (G'), the energy consumption modulus (G") and the like of the samples along with the frequency were measured. The PI=$10^5$/G, where G (Pa) is the modulus value at the intersection of the G'-frequency curve and the G"-frequency curve.

(8) the melt strength was measured by using a Rheotens melt strength meter manufactured by the Germany Geottfert Werkstoff Pruefmaschinen Company. The polymer was melted and plasticized by the single-screw extruder and downward extruded through a 90° steering head with a die having aspect ratio of 30/2 to form melt strips, which were clamped in a group of two rollers oppositely rotating at constant acceleration to be uniaxially drawn, the force of the melt drawing process was measured and recorded by means of a force measuring unit connected to the drawing rollers, and the maximum force value measured at the time of melt fracture was defined as the melt strength.

(9) molecular weight ($M_w$, $M_n$) and molecular weight distribution ($M_w/M_n$, $M_{z+1}/M_w$) were measured by using a PL-GPC 220 gel permeation chromatograph manufactured by the British Polymer Laboratories, Inc. or a GPCIR instrument (IR5 concentration detector) manufactured by the Spain Polymer Char Company. The chromatographic column was three serial PLgel 13 um Olexis columns, the solvent and mobile phase were 1,2,4-trichlorobenzene (containing 250 ppm of antioxidant 2,6-dibutyl p-cresol), the column temperature was 150° C., the flow rate was 1.0 ml/min, and the EasiCal PS-1 narrowly distributed polystyrene standard sample from the PL Company was used for universal calibration. The preparation process of room-temperature trichlorobenzene-soluble matters comprises accurately weighing the sample and trichlorobenzene solvent, dissolving at 150° C. for 5 hours, standing at 25° C. for 15 hours, and filtering by use of quantitative glassfiber filter paper to get the solution of the room-temperature trichlorobenzene-soluble matters used for the determination. The GPC curve area was corrected by using polypropylene with known concentration to determine the content of the room-temperature trichlorobenzene-soluble matters. The molecular weight data of the room-temperature trichlorobenzene-insoluble matters were calculated according to the GPC data of the original sample and the GPC data of the soluble matters.

(10) density measurement: according to GB/T 1033.1-2008 (ISO1183), the densities of the polypropylene base resin and the expanded polypropylene beads were obtained by the drainage method using the density accessories of the Satorius balance. The foaming ratio of the obtained polypropylene foamed material was calculated by the formula: $b=\rho 1/\rho 2$, wherein b is the foaming ratio, $\rho 1$ is the density of the polypropylene base resin, and $\rho 2$ is the apparent density of the foamed material.

(11) the oxygen index was tested according to the method described in GB/T 2406.2-2009 (ISO4589).

(12) the surface resistivity was tested according to the method described in GB/T 1410-2006 (International Electrotechnical Commission (IEC) 60167).

(13) test of compressive strength: a 50*50*25 mm sample was cut from the foam molding of the expanded beads and tested on a universal material testing machine 5967 based on US ASTM D3575-08 at a compression rate of 10 mm/min, and the compression strength when the foam molding was compressed by 50% was obtained.

Preparation of Polypropylene Base Resin HMSPP
Preparation of Polypropylene Base Resin HMSPP601

Propylene polymerization reaction was carried out in a polypropylene device, and the device mainly comprises a prepolymerization reactor, a first loop reactor, a second loop reactor and a third gas phase reactor. The polymerization method and the steps were as follows.

(1) Prepolymerization Reaction

The main catalyst (DQC-401 catalyst, provided by Beijing Oda Branch of Sinopec Catalyst Company), cocatalyst (triethylaluminum), and the first external electron donor (dicyclopentyl-dimethoxysilane, DCPMS) were precontacted at 6° C. for 20 min, and then continuously added to the continuous stirred tank prepolymerization reactor for prepolymerization reaction. The flow rate of triethylaluminum (TEA) entering the prepolymerisation reactor was 6.33 g/hr, the flow rate of dicyclopentyl-dimethoxysilane was 0.3 g/hr, the flow rate of the main catalyst was 0.6 g/hr, and the TEA/DCPMS ratio was 50 (mol/mol). The prepolymerization was carried out in the propylene liquid phase bulk environment at the temperature of 15° C. and residence time of about 4 min. The prepolymerization ratio of the catalyst was about 80-120 times.

(2) The First Step: Propylene Polymerization Reaction

The first stage: the catalyst after prepolymerization continuously entered the first loop reactor to complete propylene homopolymerization reaction of the first stage, the polymerization reaction temperature in the first loop reactor was 70° C., and the reaction pressure was 4.0 MPa; the feed of the first loop reactor was free of hydrogen, the hydrogen concentration was less than 10 ppm, measured through online chromatography, and the first propylene homopolymer A was obtained.

The second stage: the propylene homopolymerization reaction of the second stage was carried out in the second loop reactor connected in series with the first loop reactor. 0.63 g/hr of tetraethoxysilane (TEOS) was added along with propylene in the second loop reactor to be mixed with the reaction stream from the first loop reactor, the TEA/TEOS ratio was 5 (mol/mol), and TEOS was the second external electron donor. The polymerization temperature of the second loop reactor was 70° C. and the reaction pressure was 4.0 MPa. A certain amount of hydrogen was added along with the propylene feed, and the concentration of hydrogen in the feed was 3,000 ppm, measured through online chromatography, and the second propylene homopolymer B was generated in the second loop reactor, so that the propylene homopolymer component comprising the first propylene homopolymer and the second propylene homopolymer was obtained.

(3) The Second Step: Ethylene/Propylene Copolymerization Reaction

A certain amount of hydrogen was added to the third reactor, and $H_2/(C_2+C_3)=0.06$ (mol/mol), and $C_2/(C_2+C_3)=0.3$ (mol/mol) ($C_2$ and $C_3$ respectively refer to ethylene and propylene). The ethylene/propylene copolymerization reaction was further initiated in the third reactor at the reaction temperature of 75° C. to produce the propylene-ethylene copolymer component C.

The final product contains the first propylene homopolymer, the second propylene homopolymer and the propylene-ethylene copolymer component, the unreacted catalyst was deactivated by wet nitrogen and the final product was dried by heating to obtain polymer powder. 0.1 wt % of IRGAFOS 168 additive, 0.1 wt % of IRGANOX 1010 additive and 0.05 wt % of calcium stearate were added to the resulting powder and granulated with the twin-screw extruder. The analysis results of the polymer and the physical properties of the polymers were shown in Tables 1 and 2.

Preparation of Polypropylene Base Resin HMSPP602

The catalyst, the prepolymerization and polymerization process conditions for the preparation of HMSPP602 were the same as those for the preparation of HMSPP601. The differences from the preparation of the HMSPP601 were that the amount of hydrogen in the second reactor in the second stage was 13,000 ppm, the $H_2/(C_2+C_3)$ in the gas phase reactor of the second step was 0.49 (mol/mol), the first external electron donor was methyl-isopropyl-dimethoxysilane (MIPMS), and the addition amount was unchanged. The analysis results of the polymer and the physical properties of the polymer were shown in Tables 1 and 2.

Preparation of Polypropylene Base Resin HMSPP603

The catalyst, the prepolymerization and polymerization process conditions for the preparation of HMSPP603 were the same as those for the preparation of HMSPP601. The differences from the preparation of the HMSPP601 were that the second external electron donor was 2,2-diisobutyl-1,3-dimethoxypropane (DIBMP), the addition amount was unchanged and the amount of hydrogen in the second reactor in the second stage was 3,600 ppm. The analysis results of the polymer and the physical properties of the polymer were shown in Tables 1 and 2.

transition metal salt, and the flame-retardant component C was the inorganic flame-retardant component.

(1) Preparation of the (Halogen-Free) Flame Retardant

Triphenylphosphine oxide and cobalt nitrate were added to ethanol and stirred at a rate of 100 rpm. The mixture was then heated at 40° C. for 4 h under microwave irradiation with heating power of 50 W while stirring. The complex $Co(OPPh_3)_2(NO_3)_2$ formed by triphenylphosphine oxide and cobalt nitrate was obtained by supercritical drying of the material after microwave heating. The structures and microscopic morphology of the complexes were characterized by infrared spectroscopy and scanning electron microscopy. The results were shown in FIG. 1 and FIG. 2.

The prepared complex $Co(OPPh_3)_2(NO_3)_2$ was mechanically stirred with magnesium hydroxide at a rate of 10 rpm to obtain the flame retardant.

Figure 2:
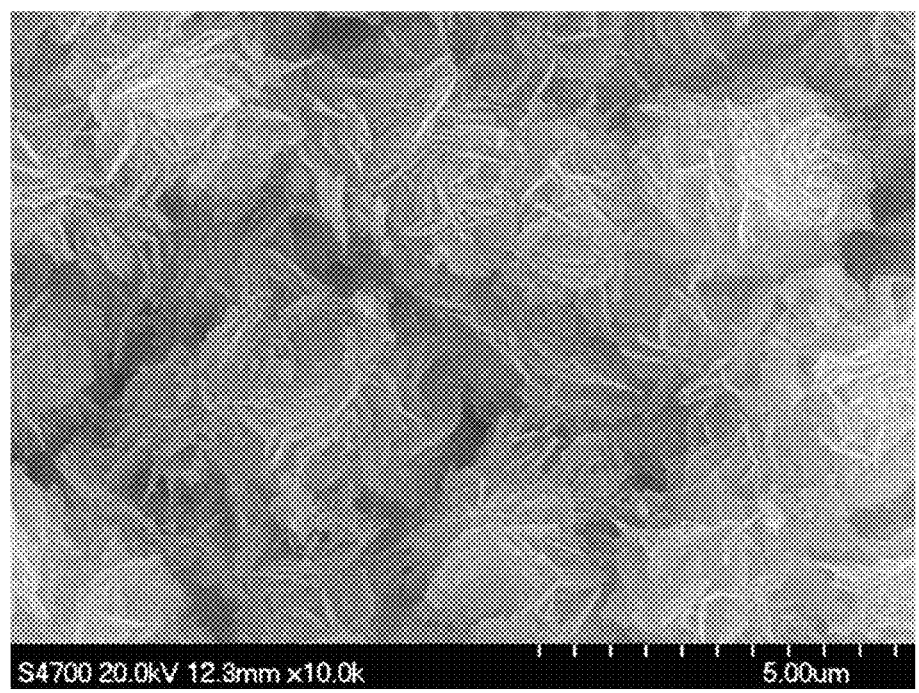
FIG. 2 shows the scanning electron micrograph of the microscopic morphology of the complex $Co(OPPh_3)_2(NO_3)_2$.

FIG. 1 shows the infrared spectrum of the complex $Co(OPPh_3)_2(NO_3)_2$. It can be seen from the figure that in the infrared spectrum of the complex, the peaks at 1143 cm$^{-1}$ and 1070 cm$^{-1}$ correspond to the P—O stretching vibration and move toward the direction of low wave number com-

TABLE 1

Polymerization Process Conditions and Analysis Results of the Polypropylene Base Resin

| | External electron donor | | Hydrogen concentration (ppm) | | $H_2/(C_2 + C_3)$ (v/v) | $C_2/(C_2 + C_3)$ (v/v) |
|---|---|---|---|---|---|---|
| | | | Homopolymerization | Homopolymerization | Copolymerization | Copolymerization |
| Trademark | DONOR-1 | DONOR-2 | of the first stage | of the second stage | of the second step | of the second step |
| HMSPP601 | DCPMS | TEOS | 0 | 3000 | 0.06 | 0.3 |
| HMSPP602 | MIPMS | TEOS | 0 | 13000 | 0.49 | 0.3 |
| HMSPP603 | DCPMS | DIBMP | 0 | 3600 | 0.06 | 0.3 |

| | MFR (g/10 min) | | Size and distribution of molecular weight (Polymer A + B) | | | Size and distribution of molecular weight (Polymer A + B + C) | | |
|---|---|---|---|---|---|---|---|---|
| Trademark | Polymer (A + B) | Polymer (A + B + C) | $M_w \times 10^{-4}$ (g/mol) | $M_w/M_n$ | $M_{n+1}/M_w$ | $M_w \times 10^{-4}$ (g/mol) | $M_w/M_n$ | $M_{n+1}/M_w$ |
| HMSPP601 | 0.4 | 0.43 | 96.8 | 10.5 | 106 | 71.8 | 7.9 | 12 |
| HMSPP602 | 0.4 | 0.43 | 97.2 | 10.4 | 107 | 70.6 | 7.0 | 12.7 |
| HMSPP603 | 0.38 | 0.4 | 98.0 | 10.8 | 110 | 73.2 | 8.1 | 12.3 |

Note:
DONOR-1 was the first external electron donor, and DONOR-2 was the second external electron donor.

TABLE 2

Physical Properties of the Polypropylene Base Resin

| Trademark | Ethylene content of the base resin wt % | $M_w$ of room-temperature trichlorobenzene-soluble matters ($10^4$ g/mol) | $M_w$ of room-temperature trichlorobenzene-insoluble matters ($10^4$ g/mol) | $M_w$(room-temperature trichlorobenzene-soluble matters)/ $M_w$(room-temperature trichlorobenzene-insoluble matters) | Content of room-temperature xylene-soluble matters wt % |
|---|---|---|---|---|---|
| HMSPP601 | 10.0 | 56.7 | 81.2 | 0.70 | 19.8 |
| HMSPP602 | 10.5 | 55.2 | 80.6 | 0.68 | 21.8 |
| HMSPP603 | 9.2 | 54.3 | 82.1 | 0.66 | 17.5 |

| Trademark | Ethylene content of room-temperature xylene-soluble matters wt % | Polydispersity index (PI) | Tensile strength MPa | flexural modulus GPa | Melt strength (die temperature 200° C.) N | Melt strength (die temperature 220° C.) N | Izod notched impact strength at 23° C. KJ/m$^2$ |
|---|---|---|---|---|---|---|---|
| HMSPP601 | 42.9 | 5.27 | 24.4 | 0.93 | >2 | 1.3 | 82.6 |
| HMSPP602 | 46.7 | 5.2 | 23.5 | 0.91 | >2 | 1.3 | 88.4 |
| HMSPP603 | 42.5 | 5.1 | 25.8 | 1.01 | >2 | 1.4 | 77.6 |

Example 1

The raw material ratio and the reaction conditions for the preparation of the flame retardant, the polypropylene composition, the expanded beads and other products in this Example were shown in Tables 3 and 4, and the performance parameters of the expanded beads were also listed in Table 4. In the tables, the flame-retardant component A was phosphine oxide, the flame-retardant component B was the pared with triphenylphosphine oxide, proving the formation of the complex. The peaks at 1258 $cm^{-1}$, 1024 $cm^{-1}$ and 812 $cm^{-1}$ correspond to coordination of $O.NO_2$, thus demonstrating the tetrahedral structure of the complex.

(2) Preparation of Carbon Nanofiber Antistatic Agent

A pretreated material was obtained by carrying out grinding pretreatment on coal tar pitch having carbon content of 85 wt % as the carbon source with mixed acid of phosphoric acid/nitric acid/hydrochloric acid (volume ratio 1:1:1).

The above-mentioned pretreated material and the catalyst cobalt nitrate were mixed in a ball mill to obtain a complex.

Figure 3:
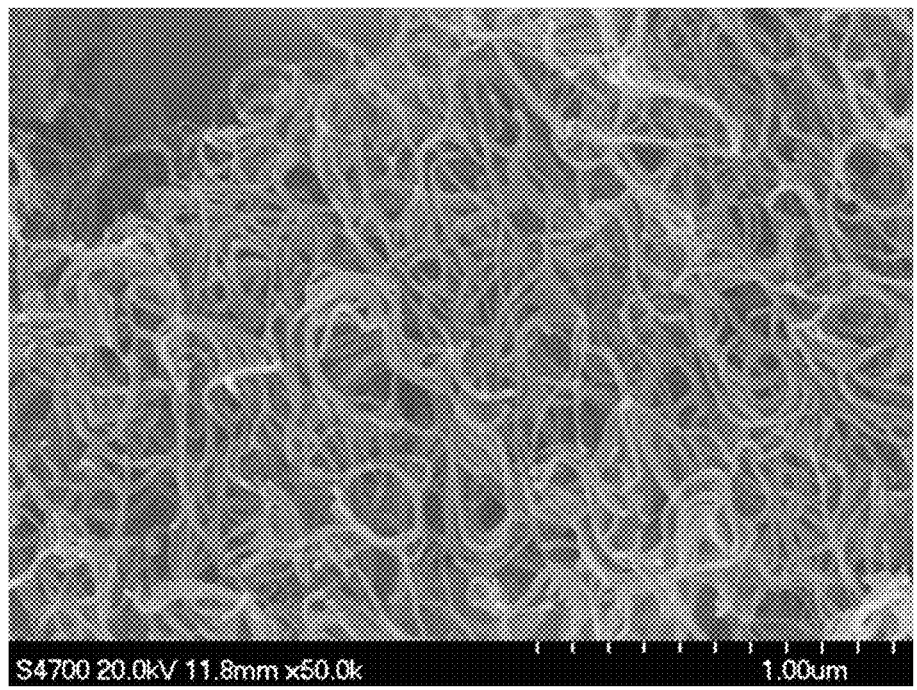
FIG. 3 shows the scanning electron micrograph of the microscopic morphology of carbon nanofibers.

The complex was subjected to carbonization reaction under the high-purity nitrogen at 950° C. for 1.5 hours and then cooled to room temperature to obtain self-assembled carbon nanofibers. Post-treatment for removing catalyst metal impurities was not needed, and the carbon nanofibers contain 2 wt % of cobalt, as measured. The microscopic morphology of the carbon nanofibers was shown in FIG. 3.

(3) Preparation of (Halogen-Free) Flame-Retardant Polypropylene Composition

The HMSPP601, the above-prepared carbon nanofiber antistatic agent, the cell nucleating agent zinc borate, the antioxidant 1010 (BASF Company) and the antioxidant 168 (BASF Company) were evenly mixed with the above-prepared flame retardant in the high-speed stirrer. The mixed material was then added into the feeder of the twin-screw extruder manufactured by the Coperion Company, the material entered the twin screws via the feeder and the temperature of the screws was maintained at 170-200° C. during processing. The material was melted and mixed evenly by the screws, and then entered the Labline100 micropellet preparation system, the torque was controlled at about 65%, and the rotation speed was controlled at 300 rpm. The flame-retardant antistatic polypropylene composition micropellets were obtained. The Izod notched impact strength of the composition material at 23° C. was 25.8 $KJ/m^2$.

(4) Preparation of (Halogen-Free) Flame-Retardant Antistatic Expanded Polypropylene Beads 1. The above-prepared flame-retardant polypropylene composition, the dispersing medium water, the surfactant sodium dodecylbenzene sulfonate, the dispersant kaolin, the dispersant enhancer aluminum sulfate and other additives were mixed in the autoclave to obtain a dispersion.

2. The residual air in the autoclave was removed by using the inert blowing agent carbon dioxide and the inert blowing agent was further introduced, and the pressure inside the autoclave was initially adjusted until it was stable. The dispersion in the autoclave was then stirred.

3. Then, the pressure inside the autoclave was adjusted to achieve the pressure required for foaming. The temperature was raised to the foaming temperature at an average heating rate of 0.1° C./min, and the foaming temperature was 0.5-1° C. lower than the melting temperature of the micropellets. At the foaming temperature and pressure, stirring was continued for 0.25-0.5 hour.

4. The outlet of the autoclave was then opened and the materials in the autoclave were discharged into the collection tank to obtain the expanded polypropylene beads. The carbon dioxide gas was fed while the discharge is being carried out so that the pressure in the autoclave was maintained near the foaming pressure before all the particles were completely foamed and entered into the collection tank. Then the expanded beads were washed and dried at 60° C. for 5 hours.

Figure 4:
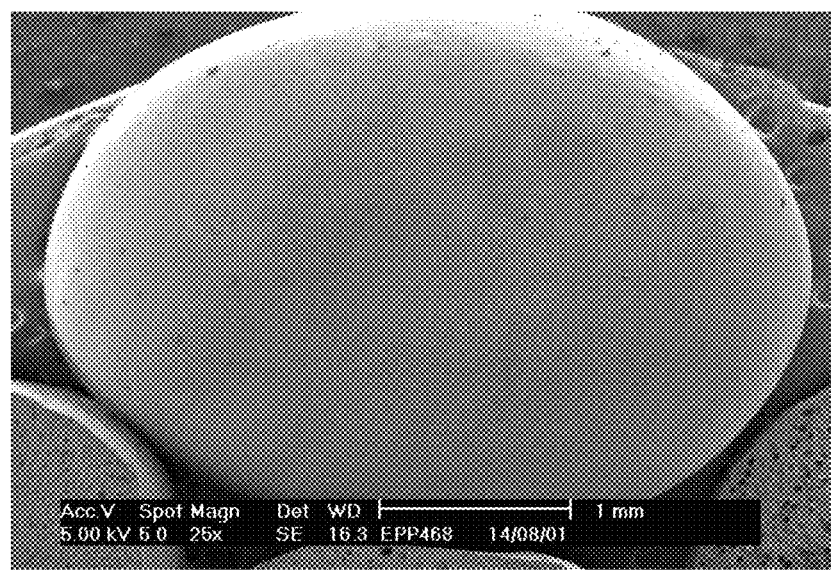
FIG. 4 shows the surface electron micrograph of the flame-retardant antistatic expanded polypropylene beads prepared in Example 2.
Figure 5:
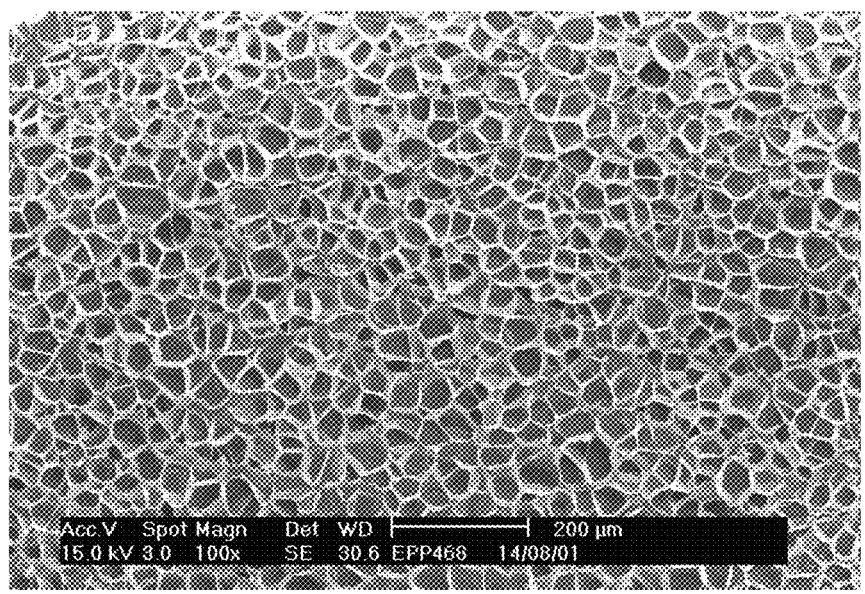
FIG. 5 shows the cross-sectional electron micrograph of the flame-retardant antistatic expanded polypropylene beads prepared in Example 2.

5. The density of the expanded beads was measured and the results were shown in Table 4. The surface and cross-sectional morphologies of the expanded beads were characterized by scanning electron microscope, and the results were shown in FIG. 4 and FIG. 5, respectively.

(5) Preparation and Performance Test of the Foam Molding of the Expanded Beads

The dried expanded beads were allowed to stand for aging at room temperature for about 12 hours, then added to the molding machine, and molded into the foam molding of the expanded beads by using water vapor at molding pressure of 0.22 MPa. The resulting foam molding was allowed to stand in an oven at 80° C. for 12 hours. The oxygen index, the carbon residue rate, the flame height, the smoke condition, the surface resistivity, the compressive strength and other parameters of the foam molding were measured according to the method described above. The surface resistivity of the foam molding was measured when the foam molding was just prepared, and the surface resistivity of the foam molding was measured again after the foam molding was allowed to stand for 30 days in the absence of special protective measures. The test results were shown in Table 4.

Example 2

The flame retardant, the carbon nanofiber antistatic agent, the flame-retardant polypropylene composition and the expanded beads were prepared in a manner similar to that of Example 1, except that the starting materials and the reaction conditions shown in Tables 3 and 4 were different. For example, in this example, HMSPP602 was adopted, the formed halogen-free flame retardant was the complex $Ni(OPOt_3)_2(NO_3)_2$ formed by trioctyl phosphine oxide and nickel nitrate, and the prepared carbon nanofiber antistatic agent contains 3 wt % of nickel.

Example 3

The flame retardant, the carbon nanofiber antistatic agent, the flame-retardant polypropylene composition and the expanded beads were prepared in a manner similar to that of Example 1, except that the starting materials and the reaction conditions shown in Tables 3 and 4 were different. For example, in this example, HMSPP603 was adopted, and the formed halogen-free flame retardant was the complex $Co(OPOt_3)_2(NO_3)_2$ formed by trioctylphosphine oxide and cobalt nitrate.

Example 4

The flame retardant, the carbon nanofiber antistatic agent, the flame-retardant polypropylene composition and the expanded beads were prepared in a manner similar to that of Example 1, except that the starting materials and the reaction conditions shown in Tables 3 and 4 were different. For example, in this example, the formed halogen-free flame retardant was the complex $Ni(OPPh_3)_2(NO_3)_2$ formed by triphenyl phosphine oxide and nickel nitrate.

Example 5

The flame retardant, the carbon nanofiber antistatic agent, the flame-retardant polypropylene composition and the expanded beads were prepared in a manner similar to that of Example 1, except that the starting materials and the reaction conditions shown in Tables 3 and 4 were different. For example, in this example, HMSPP602 was adopted, and the formed halogen-free flame retardant was the complex $Ni(OPHx_3)_2(NO_3)_2$ formed by trihexyl phosphine oxide and nickel nitrate.

Example 6

The flame retardant, the carbon nanofiber antistatic agent, the flame-retardant polypropylene composition and the expanded beads were prepared in a manner similar to that of Example 1, except that the starting materials and the reaction conditions shown in Tables 3 and 4 were different. For example, in this example, HMSPP603 was adopted, and the formed halogen-free flame retardant was the complex $Co(OPDe_3)_2(NO_3)_2$ formed by tridecylphosphine oxide and cobalt nitrate.

Example 7

The test process similar to that of Example 1 was implemented, except that the carbon nanofiber antistatic agent was not prepared or used. The specific raw material formula, the reaction conditions and the performance of the final foamed material were shown in Table 3 and Table 4.

Example 8

The test process similar to that of Example 1 was implemented, except that tributyl phosphate instead of triphenylphosphine oxide was used to prepare the complex. The specific raw material formula, the reaction conditions and the performance of the final foamed material were shown in Table 3 and Table 4.

Example 9

The test process similar to that of Example 1 was implemented, except that dibutyl butylphosphonate instead of triphenylphosphine oxide was used to prepare the complex, and the inorganic flame-retardant component was not used. The specific raw material formula, the reaction conditions and the performance of the final foamed material were shown in Table 3 and Table 4.

Example 10

The test process similar to that of Example 1 was implemented, except that ordinary impact copolypropylene EPS30R instead of polypropylene base resin HMSPP601 with high melt strength was adopted. The specific raw material formula, the reaction conditions and the performance of the final foamed material were shown in Table 3 and Table 4.

Example 11

The test process similar to that of Example 1 was implemented, except that the process (2) was not implemented, and in the preparation of the flame-retardant polypropylene composition in the process (3), the antistatic agent was carbon black. The specific raw material formula, the reaction conditions and the performance of the final foamed material were shown in Table 3 and Table 4.

Example 12

The test process similar to that of Example 1 was implemented, except that the process (2) was not implemented, and in the preparation of the flame-retardant polypropylene composition in the process (3), the antistatic agent was Atmer129. The specific raw material formula, the reaction conditions and the performance of the final foamed material were shown in Table 3 and Table 4.

Example 13

The test process similar to that of Example 1 was implemented, except that linear low-density polyethylene 7042 with 1-butene as the comonomer instead of polypropylene base resin HMSPP601 with high melt strength was adopted. The specific raw material formula, the reaction conditions and the performance of the final foamed material were shown in Table 3 and Table 4.

Example 14

The test process similar to that of Example 1 was implemented, except that the metallocene catalyst was adopted, and polyethylene HPE001 with 1-hexene as the comonomer instead of polypropylene base resin HMSPP601 with high melt strength was adopted. The specific raw material formula, the reaction conditions and the performance of the final foamed material were shown in Table 3 and Table 4.

Example 15

The test process similar to that of Example 1 was implemented, except that the Ziegler-natta catalyst was adopted, and polyethylene HPE002 with 1-hexene as the comonomer instead of polypropylene base resin HMSPP601 with high melt strength was adopted. The specific raw material formula, the reaction conditions and the performance of the final foamed material were shown in Table 3 and Table 4.

Example 16

The test process similar to that of Example 1 was implemented, except that low-density polyethylene LD100AC instead of polypropylene base resin HMSPP601 with high melt strength was adopted. The specific raw material formula, the reaction conditions and the performance of the final foamed material were shown in Table 3 and Table 4.

Example 17

The test process similar to that of Example 1 was implemented, except that foaming-grade polylactic acid PLA instead of polypropylene base resin HMSPP601 with high melt strength was adopted. The specific raw material formula, the reaction conditions and the performance of the final foamed material were shown in Table 3 and Table 4.

Example 18

The test process similar to that of Example 1 was implemented, except that foaming-grade thermoplastic polyurethane TPU instead of polypropylene base resin HMSPP601 with high melt strength was adopted. The specific raw material formula, the reaction conditions and the performance of the final foamed material were shown in Table 3 and Table 4.

Example 19

The test process similar to that of Example 1 was implemented, except that foaming-grade polybutylene terephthalate PBT instead of polypropylene base resin HMSPP601 with high melt strength was adopted. The specific raw material formula, the reaction conditions and the performance of the final foamed material were shown in Table 3 and Table 4.

Example 20

The test process similar to that of Example 1 was implemented, except that foaming-grade polyethylene terephthalate PET instead of polypropylene base resin HMSPP601 with high melt strength was adopted. The specific raw material formula, the reaction conditions and the performance of the final foamed material were shown in Table 3 and Table 4.

Example 21

The test process similar to that of Example 1 was implemented, except that foaming-grade polyamide 6 PA6 instead of polypropylene base resin HMSPP601 with high melt strength was adopted. The specific raw material formula, the reaction conditions and the performance of the final foamed material were shown in Table 3 and Table 4.

Example 22

The test process similar to that of Example 1 was implemented, except that foaming-grade poly(butylene succinate) PBS instead of polypropylene base resin HMSPP601 with high melt strength was adopted. The specific raw material formula, the reaction conditions and the performance of the final foamed material were shown in Table 3 and Table 4.

Comparative Example 1

The test process similar to that of Example 1 was implemented, except that the flame retardant was triphenylphosphine oxide and magnesium hydroxide. The specific raw material formula, the reaction conditions and the performance of the final foamed material were shown in Table 3 and Table 4.

Comparative Example 2

The test process similar to that of Example 1 was implemented, except that the process (1) was not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 3

The test process similar to that of Example 1 was implemented, except that the process (1) was not implemented, and in the preparation of the flame-retardant polypropylene composition in the process (3), the flame retardant was a composition of hexabromocyclododecane and antimony trioxide (weight ratio about 2.5:1). The specific raw material formula, the reaction conditions and the performance of the final foamed material were shown in Table 3 and Table 4.

Comparative Example 4

The test process similar to that of Example 1 was implemented, except that the flame retardant was cobalt phosphate. The specific raw material formula, the reaction conditions and the performance of the final foamed material were shown in Table 3 and Table 4.

Comparative Example 5

The test process similar to that of Example 2 was implemented, except that the process (1) was not implemented, and in the preparation of the flame-retardant polypropylene composition in the process (3), the flame retardant was aluminum hydroxide. The specific raw material formula, the reaction conditions and the performance of the final foamed material were shown in Table 3 and Table 4.

Comparative Example 6

The test process similar to that of Example 3 was implemented, except that the process (1) was not implemented, and in the preparation of the flame-retardant polypropylene composition in the process (3), the flame retardant was ammonium polyphosphate. The specific raw material formula, the reaction conditions and the performance of the final foamed material were shown in Table 3 and Table 4.

Comparative Example 7

The test process similar to that of Example 1 was implemented, except that the flame retardant was trihydroxymethyl phosphine oxide. The specific raw material formula, the reaction conditions and the performance of the final foamed material were shown in Table 3 and Table 4.

Comparative Example 8

The test process similar to that of Example 13 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 9

The test process similar to that of Example 14 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 10

The test process similar to that of Example 15 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 11

The test process similar to that of Example 16 was implemented, except that the process (1) and the process (2)

were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 12

The test process similar to that of Example 17 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 13

The test process similar to that of Example 18 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 14

The test process similar to that of Example 19 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 15

The test process similar to that of Example 20 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 16

The test process similar to that of Example 21 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

Comparative Example 17

The test process similar to that of Example 22 was implemented, except that the process (1) and the process (2) were not implemented, and in the preparation of the flame-retardant polypropylene composition in the process (3), the flame retardant was red phosphorus. The specific raw material formula, the reaction conditions and the performance of the final foamed material were shown in Table 3 and Table 4.

TABLE 3

The formula of the flame-retardant thermoplastic material used in Examples and Comparative Examples

| Item | Base resin | Amount Parts by weight | Flame retardant | Flame-retardant component A Type | Parts by weight | Flame-retardant component B Type | Parts by weight | Flame-retardant component C Type | Parts by weight |
|---|---|---|---|---|---|---|---|---|---|
| Example 1 | HMSPP601 | 100 | — | triphenyl-phosphine oxide | 7 | cobalt nitrate | 3 | magnesium hydroxide | 5 |
| Example 2 | HMSPP602 | 100 | — | Trioctyl-phosphine oxide | 6 | nickel nitrate | 4 | aluminum hydroxide | 4 |
| Example 3 | HMSPP603 | 100 | — | trioctyl-phosphine oxide | 6.5 | cobalt nitrate | 4.5 | aluminum hydroxide | 4.5 |
| Example 4 | HMSPP601 | 100 | — | triphenyl-phosphine oxide | 8.4 | nickel nitrate | 3.6 | magnesium hydroxide | 3 |
| Example 5 | HMSPP602 | 100 | — | trihexyl-phosphine oxide | 7.5 | nickel nitrate | 3.5 | aluminum hydroxide | 3.5 |
| Example 6 | HMSPP603 | 100 | | tridecyl-phosphine oxide | 6.5 | cobalt nitrate | 2.5 | magnesium hydroxide | 4 |
| Example 7 | HMSPP601 | 100 | — | triphenyl-phosphine oxide | 7 | cobalt nitrate | 3 | magnesium hydroxide | 5 |
| Example 8 | HMSPP601 | 100 | — | tributyl phosphate | 8 | nickel nitrate | 2.5 | magnesium hydroxide | 4 |
| Example 9 | HMSPP601 | 100 | — | dibutyl butylphosphate | 7 | nickel nitrate | 3 | — | — |

TABLE 3-continued

The formula of the flame-retardant thermoplastic material used in Examples and Comparative Examples

| | | | | | | | | | |
|---|---|---|---|---|---|---|---|---|---|
| Example 10 | EPS30R | 100 | — | triphenyl-phosphine oxide | 7 | cobalt nitrate | 3 | magnesium hydroxide | 5 |
| Example 11 | HMSPP601 | 100 | — | triphenyl-phosphine oxide | 7 | cobalt nitrate | 3 | magnesium hydroxide | 5 |
| Example 12 | HMSPP601 | 100 | — | triphenyl-phosphine oxide | 7 | cobalt nitrate | 3 | magnesium hydroxide | 5 |
| Example 13 | LLDPE7042 | 100 | — | triphenyl-phosphine oxide | 7 | cobalt nitrate | 3 | magnesium hydroxide | 5 |
| Example 14 | HPE001 | 100 | — | triphenyl-phosphine oxide | 7 | cobalt nitrate | 3 | magnesium hydroxide | 5 |
| Example 15 | HPE002 | 100 | — | triphenyl-phosphine oxide | 7 | cobalt nitrate | 3 | magnesium hydroxide | 5 |
| Example 16 | LD100AC | 100 | — | triphenyl-phosphine oxide | 7 | cobalt nitrate | 3 | magnesium hydroxide | 5 |
| Example 17 | PLA | 100 | — | triphenyl-phosphine oxide | 7 | cobalt nitrate | 3 | magnesium hydroxide | 5 |
| Example 18 | TPU | 100 | — | triphenyl-phosphine oxide | 7 | cobalt nitrate | 3 | magnesium hydroxide | 5 |
| Example 19 | PBT | 100 | — | triphenyl-phosphine oxide | 7 | cobalt nitrate | 3 | magnesium hydroxide | 5 |
| Example 20 | PET | 100 | — | triphenyl-phosphine oxide | 7 | cobalt nitrate | 3 | magnesium hydroxide | 5 |
| Example 21 | PA6 | 100 | — | triphenyl-phosphine oxide | 7 | cobalt nitrate | 3 | magnesium hydroxide | 5 |
| Example 22 | PBS | 100 | — | triphenyl-phosphine oxide | 7 | cobalt nitrate | 3 | magnesium hydroxide | 5 |
| Comparative example 1 | HMSPP601 | 100 | — | triphenyl-phosphine oxide | 7 | — | — | magnesium hydroxide | 5 |
| Comparative example 2 | HMSPP601 | 100 | red phosphorus | — | 20 | — | — | — | — |
| Comparative example 3 | HMSPP601 | 100 | composition of hexabromo-cyclododecane and antimony trioxide | — | — | — | — | — | — |
| Comparative example 4 | HMSPP601 | 100 | cobalt phosphate | — | 25 | — | — | — | — |
| Comparative example 5 | HMSPP602 | 100 | — | — | — | — | — | aluminum hydroxide | 12 |
| Comparative example 6 | HMSPP603 | 100 | ammonium polyphosphate | — | 35 | — | — | — | — |
| Comparative example 7 | HMSPP601 | 100 | trihydroxymethyl phosphine oxide | — | 25 | — | — | — | — |
| Comparative example 8 | LLDPE7042 | 100 | red phosphorus | — | 20 | — | — | — | — |
| Comparative example 9 | HPE001 | 100 | red phosphorus | — | 20 | — | — | — | — |
| Comparative example 10 | HPE002 | 100 | red phosphorus | — | 20 | — | — | — | — |
| Comparative example 11 | LD100AC | 100 | red phosphorus | — | 20 | — | — | — | — |
| Comparative example 12 | PLA | 100 | red phosphorus | — | 20 | — | — | — | — |
| Comparative example 13 | TPU | 100 | red phosphorus | — | 20 | — | — | — | — |
| Comparative example 14 | PBT | 100 | red phosphorus | — | 20 | — | — | — | — |
| Comparative example 15 | PET | 100 | red phosphorus | — | 20 | — | — | — | — |
| Comparative example 16 | Polyamide 6 | 100 | red phosphorus | — | 20 | — | — | — | — |
| Comparative example 17 | PBS | 100 | red phosphorus | — | 20 | — | — | — | — |

TABLE 3-continued

The formula of the flame-retardant thermoplastic material used in Examples and Comparative Examples

| | Preparation and amount of antistatic agent | | | | | | Cell nucleating agent | |
|---|---|---|---|---|---|---|---|---|
| Item | Carbon source | Catalyst type | Carbonization temperature °C. | Heat insulation time/hr | Type | Parts by weight | Type | Parts by weight |
| Example 1 | coal tar pitch | cobalt nitrate | 950 | 1.5 | carbon nanofibers | 1 | zinc borate | 0.5 |
| Example 2 | coal tar pitch | nickel nitrate | 1050 | 2.5 | carbon nanofibers | 1.5 | zinc borate | 0.4 |
| Example 3 | petroleum pitch | nickel nitrate | 1000 | 2 | carbon nanofibers | 1.5 | zinc borate | 0.5 |
| Example 4 | coal tar pitch | nickel nitrate | 1050 | 2.5 | carbon nanofibers | 1 | zinc borate | 0.4 |
| Example 5 | bamboo charcoal | nickel nitrate | 1150 | 1.5 | carbon nanofibers | 1.5 | zinc borate | 0.5 |
| Example 6 | bamboo charcoal | cobalt nitrate | 1000 | 2 | carbon nanofibers | 1 | zinc borate | 0.3 |
| Example 7 | coal tar pitch | cobalt nitrate | 950 | 1.5 | — | — | zinc borate | 0.5 |
| Example 8 | bamboo charcoal | nickel nitrate | 1150 | 1.5 | carbon nanofibers | 1.5 | zinc borate | 0.3 |
| Example 9 | petroleum pitch | nickel nitrate | 1000 | 2 | carbon nanofibers | 1.5 | calcium carboante | 0.3 |
| Example 10 | coal tar pitch | cobalt nitrate | 950 | 1.5 | carbon nanofibers | 1 | zinc borate | 0.5 |
| Example 11 | — | — | — | — | carbon black | 6 | zinc borate | 0.5 |
| Example 12 | — | — | — | — | Atmer129 | 3 | zinc borate | 0.5 |
| Example 13 | coal tar pitch | cobalt nitrate | 950 | 1.5 | carbon nanofibers | 1 | zinc borate | 0.5 |
| Example 14 | coal tar pitch | cobalt nitrate | 950 | 1.5 | carbon nanofibers | 1 | zinc borate | 0.5 |
| Example 15 | coal tar pitch | cobalt nitrate | 950 | 1.5 | carbon nanofibers | 1 | zinc borate | 0.5 |
| Example 16 | coal tar pitch | cobalt nitrate | 950 | 1.5 | carbon nanofibers | 1 | zinc borate | 0.5 |
| Example 17 | coal tar pitch | cobalt nitrate | 950 | 1.5 | carbon nanofibers | 1 | zinc borate | 0.5 |
| Example 18 | coal tar pitch | cobalt nitrate | 950 | 1.5 | carbon nanofibers | 1 | zinc borate | 0.5 |
| Example 19 | coal tar pitch | cobalt nitrate | 950 | 1.5 | carbon nanofibers | 1 | zinc borate | 0.5 |
| Example 20 | coal tar pitch | cobalt nitrate | 950 | 1.5 | carbon nanofibers | 1 | zinc borate | 0.5 |
| Example 21 | coal tar pitch | cobalt nitrate | 950 | 1.5 | carbon nanofibers | 1 | zinc borate | 0.5 |
| Example 22 | coal tar pitch | cobalt nitrate | 950 | 1.5 | carbon nanofiber | 1 | zinc borate | 0.5 |
| Comparative example 1 | coal tar pitch | cobalt nitrate | 950 | 1.5 | carbon nanofibers | 1 | zinc borate | 0.5 |
| Comparative example 2 | coal tar pitch | cobalt nitrate | 950 | 1.5 | carbon nanofibers | 1 | zinc borate | 0.5 |
| Comparative example 3 | coal tar pitch | cobalt nitrate | 950 | 1.5 | carbon nanofibers | 1 | zinc borate | 0.5 |
| Comparative example 4 | coal tar pitch | cobalt nitrate | 950 | 1.5 | carbon nanofibers | 1 | zinc borate | 0.5 |
| Comparative example 5 | coal tar pitch | nickel nitrate | 1050 | 2.5 | carbon nanofibers | 1.5 | zinc borate | 0.5 |
| Comparative example 6 | petroleum pitch | nickel nitrate | 1000 | 2 | carbon nanofibers | 1.5 | zinc borate | 0.5 |
| Comparative example 7 | coal tar pitch | cobalt nitrate | 950 | 1.5 | carbon nanofibers | 1 | zinc borate | 0.5 |
| Comparative example 8 | coal tar pitch | cobalt nitrate | 950 | 1.5 | carbon nanofibers | 1 | zinc borate | 0.5 |
| Comparative example 9 | coal tar pitch | cobalt nitrate | 950 | 1.5 | carbon nanofibers | 1 | zinc borate | 0.5 |
| Comparative example 10 | coal tar pitch | cobalt nitrate | 950 | 1.5 | carbon nanofibers | 1 | zinc borate | 0.5 |
| Comparative example 11 | coal tar pitch | cobalt nitrate | 950 | 1.5 | carbon nanofibers | 1 | zinc borate | 0.5 |
| Comparative example 12 | coal tar pitch | cobalt nitrate | 950 | 1.5 | carbon nanofibers | 1 | zinc borate | 0.5 |
| Comparative example 13 | coal tar pitch | cobalt nitrate | 950 | 1.5 | carbon nanofibers | 1 | zinc borate | 0.5 |

TABLE 3-continued

The formula of the flame-retardant thermoplastic material used in Examples and Comparative Examples

| Comparative example 14 | coal tar pitch | cobalt nitrate | 950 | 1.5 | carbon nanofibers | 1 | zinc borate | 0.5 |
| Comparative example 15 | coal tar pitch | cobalt nitrate | 950 | 1.5 | carbon nanofibers | 1 | zinc borate | 0.5 |
| Comparative example 16 | coal tar pitch | cobalt nitrate | 950 | 1.5 | carbon nanofibers | 1 | zinc borate | 0.5 |
| Comparative example 17 | coal tar pitch | cobalt nitrate | 950 | 1.5 | carbon nanofibers | 1 | zinc borate | 0.5 |

TABLE 4

Comparison of the process parameters for preparation of flame-retardant thermoplastic expanded beads and product performance in Examples and Comparative Examples

| Item | Foaming temperature °C. | Foaming pressure MPa | Sample density g/cm³ | cell density/cm³ | Melting pressure of expanded beads MPa | 50% Compressive strength kPa | Combustion extinguishing time s |
|---|---|---|---|---|---|---|---|
| Example 1 | 160 | 2 | 0.21 | $2.5 \times 10^8$ | 0.22 | 579 | 2 |
| Example 2 | 162 | 2.5 | 0.18 | $3.4 \times 10^8$ | 0.23 | 578 | 2 |
| Example 3 | 161 | 3 | 0.15 | $3.7 \times 10^8$ | 0.21 | 576 | 2 |
| Example 4 | 159 | 3.5 | 0.11 | $3.9 \times 10^8$ | 0.22 | 575 | 2 |
| Example 5 | 160 | 4 | 0.09 | $5.5 \times 10^8$ | 0.23 | 573 | 1 |
| Example 6 | 162 | 4.5 | 0.07 | $5.1 \times 10^8$ | 0.22 | 571 | 2 |
| Example 7 | 161 | 4 | 0.10 | $4.9 \times 10^8$ | 0.22 | 572 | 1 |
| Example 8 | 160 | 4 | 0.09 | $4.8 \times 10^8$ | 0.23 | 573 | 1 |
| Example 9 | 161 | 4 | 0.11 | $5.0 \times 10^8$ | 0.23 | 574 | 1 |
| Example 10 | 165 | 3 | 0.15 | $8.5 \times 10^7$ | 0.29 | 575 | 4 |
| Example 11 | 159 | 2.5 | 0.13 | $9.2 \times 10^4$ | 0.36 | 178 | 3 |
| Example 12 | 165 | 3 | 0.15 | $8.5 \times 10^7$ | 0.29 | 177 | 4 |
| Example 13 | 124 | 3.5 | 0.12 | $4.1 \times 10^8$ | 0.15 | 395 | 2 |
| Example 14 | 126 | 4 | 0.11 | $2.5 \times 10^8$ | 0.18 | 405 | 2 |
| Example 15 | 126 | 3.5 | 0.1 | $3.2 \times 10^8$ | 0.17 | 408 | 2 |
| Example 16 | 110 | 3.5 | 0.11 | $1.8 \times 10^8$ | 0.18 | 259 | 2 |
| Example 17 | 145 | 3 | 0.08 | $1.5 \times 10^8$ | 0.16 | 368 | 2 |
| Example 18 | 80 | 5 | 0.19 | $1.6 \times 10^8$ | 0.35 | 515 | 2 |
| Example 19 | 180 | 5 | 0.18 | $2.1 \times 10^8$ | 0.45 | 408 | 1 |
| Example 20 | 200 | 3.5 | 0.15 | $2.5 \times 10^8$ | 0.32 | 509 | 1 |
| Example 21 | 220 | 3.5 | 0.19 | $3.4 \times 10^8$ | 0.64 | 575 | 1 |
| Example 22 | 120 | 4 | 0.22 | $2.5 \times 10^8$ | 0.19 | 495 | 1 |
| Comparative example 1 | 160 | 2 | 0.23 | $9.4 \times 10^5$ | 0.22 | 395 | 4 |
| Comparative example 2 | 162 | 2.5 | 0.16 | $3.5 \times 10^4$ | 0.28 | 180 | 5 |
| Comparative example 3 | 161 | 2 | 0.13 | $8.4 \times 10^5$ | 0.35 | 181 | 3 |
| Comparative example 4 | 162 | 2.5 | 0.21 | $8.5 \times 10^5$ | 0.23 | 421 | 5 |
| Comparative example 5 | 162 | 2.5 | 0.17 | $3.8 \times 10^5$ | 0.35 | 179 | 5 |
| Comparative example 6 | 161 | 3 | 0.14 | $4.9 \times 10^5$ | 0.37 | 176 | 4 |
| Comparative example 7 | 161 | 3 | 0.18 | $8.6 \times 10^5$ | 0.21 | 412 | 4 |
| Comparative example 8 | 124 | 3.5 | 0.15 | $2.3 \times 10^6$ | 0.15 | 318 | 5 |
| Comparative example 9 | 126 | 4 | 0.19 | $4.2 \times 10^6$ | 0.18 | 352 | 6 |
| Comparative example 10 | 126 | 3.5 | 0.18 | $9.1 \times 10^6$ | 0.17 | 235 | 5 |
| Comparative example 11 | 110 | 3.5 | 0.19 | $2.4 \times 10^6$ | 0.18 | 205 | 6 |
| Comparative example 12 | 145 | 3 | 0.21 | $3.5 \times 10^6$ | 0.16 | 345 | 6 |
| Comparative example 13 | 80 | 5 | 0.45 | $4.5 \times 10^6$ | 0.35 | 399 | 4 |
| Comparative example 14 | 180 | 5 | 0.46 | $5.8 \times 10^6$ | 0.45 | 358 | 5 |
| Comparative example 15 | 200 | 3.5 | 0.25 | $1.5 \times 10^6$ | 0.44 | 398 | 6 |
| Comparative example 16 | 220 | 3.5 | 0.34 | $2.4 \times 10^6$ | 0.55 | 415 | 5 |
| Comparative example 17 | 120 | 4 | 0.41 | $1.6 \times 10^6$ | 0.53 | 296 | 4 |

TABLE 4-continued

Comparison of the process parameters for preparation of flame-retardant thermoplastic expanded beads and product performance in Examples and Comparative Examples

| Item | Residual Mass Fraction % | Flame Height mm | Limiting oxygen index LOI | Smoke Condition | Surface and Cell Structure | Surface Resistivity Ω (0th day) | Surface Resistivity Ω (30th day) |
|---|---|---|---|---|---|---|---|
| Example 1 | 3.2 | 15 | 29.5 | — | ✓ | $6.0*10^8$ | $6.1*10^8$ |
| Example 2 | 3.5 | 14 | 29.6 | — | ✓ | $3.4*10^8$ | $3.5*10^8$ |
| Example 3 | 3.3 | 13 | 28.6 | — | ✓ | $4.2*10^8$ | $4.3*10^8$ |
| Example 4 | 3.4 | 13 | 30.1 | — | ✓ | $1.1*10^8$ | $1.2*10^8$ |
| Example 5 | 3.3 | 15 | 30.2 | — | ✓ | $4.4*10^8$ | $4.6*10^8$ |
| Example 6 | 3.6 | 14 | 28.9 | — | ✓ | $9.3*10^8$ | $9.4*10^8$ |
| Example 7 | 3.3 | 13 | 29.2 | — | ✓ | $1.2*10^{13}$ | $1.3*10^{13}$ |
| Example 8 | 3.4 | 12 | 30.2 | — | ✓ | $5.4*10^8$ | $5.6*10^8$ |
| Example 9 | 3.5 | 14 | 29.9 | — | ✓ | $4.3*10^8$ | $4.4*10^8$ |
| Example 10 | 3.2 | 19 | 25.1 | — | x | $2.6*10^8$ | $2.7*10^8$ |
| Example 11 | 4.3 | 20 | 21.2 | o | x | $1.3*10^9$ | $1.4*10^9$ |
| Example 12 | 3.2 | 19 | 25.1 | — | x | $3.5*10^9$ | $2.8*10^{13}$ |
| Example 13 | 3.2 | 13 | 29.6 | — | ✓ | $3.4*10^8$ | $3.5*10^8$ |
| Example 14 | 3.1 | 14 | 29.5 | — | ✓ | $4.0*10^8$ | $4.1*10^8$ |
| Example 15 | 3.5 | 13 | 30.1 | — | ✓ | $3.3*10^8$ | $3.4*10^8$ |
| Example 16 | 3.1 | 15 | 29.2 | — | ✓ | $2.5*10^8$ | $2.6*10^8$ |
| Example 17 | 3.2 | 15 | 28.5 | — | ✓ | $4.4*10^8$ | $4.5*10^8$ |
| Example 18 | 3.2 | 14 | 28.3 | — | ✓ | $5.6*10^8$ | $5.7*10^8$ |
| Example 19 | 3.1 | 13 | 28.4 | — | ✓ | $4.7*10^8$ | $4.8*10^8$ |
| Example 20 | 3.5 | 13 | 28.2 | — | ✓ | $2.1*10^8$ | $2.2*10^8$ |
| Example 21 | 3.3 | 14 | 28.5 | — | ✓ | $3.5*10^8$ | $3.6*10^8$ |
| Example 22 | 3.1 | 12 | 29.8 | — | ✓ | $4.2*10^8$ | $4.3*10^8$ |
| Comparative example 1 | 5.5 | 21 | 22.1 | o | x | $5.3*10^{11}$ | $5.4*10^{11}$ |
| Comparative example 2 | 5.5 | 27 | 17.0 | o | x | $3.4*10^{11}$ | $3.5*10^{11}$ |
| Comparative example 3 | 4.9 | 21 | 22.9 | o | x | $5.2*10^{10}$ | $5.3*10^{10}$ |
| Comparative example 4 | 4.2 | 20 | 24.4 | o | x | $2.4*10^{11}$ | $2.5*10^{11}$ |
| Comparative example 5 | 4.7 | 21 | 20.1 | o | x | $9.3*10^{11}$ | $9.4*10^{11}$ |
| Comparative example 6 | 3.8 | 16 | 22.3 | — | x | $1.5*10^{11}$ | $1.5*10^{11}$ |
| Comparative example 7 | 5.3 | 22 | 23.7 | o | x | $6.5*10^{11}$ | $6.6*10^{11}$ |
| Comparative example 8 | 5.2 | 21 | 20.5 | o | x | $4.3*10^{11}$ | $4.4*10^{11}$ |
| Comparative example 9 | 6.1 | 19 | 21.6 | o | x | $2.5*10^{11}$ | $2.6*10^{11}$ |
| Comparative example 10 | 5.5 | 21 | 24.5 | o | x | $6.5*10^{11}$ | $6.6*10^{11}$ |
| Comparative example 11 | 6.1 | 18 | 25.1 | o | x | $7.4*10^{11}$ | $7.5*10^{11}$ |
| Comparative example 12 | 7.2 | 19 | 23.5 | o | x | $6.5*10^{11}$ | $6.6*10^{11}$ |
| Comparative example 13 | 5.2 | 25 | 23.4 | o | x | $4.2*10^{11}$ | $4.3*10^{11}$ |
| Comparative example 14 | 4.1 | 21 | 25.2 | o | x | $5.7*10^{11}$ | $5.8*10^{11}$ |
| Comparative example 15 | 6.1 | 27 | 24.3 | — | ✓ | $6.3*10^{11}$ | $6.4*10^{11}$ |
| Comparative example 16 | 5.5 | 26 | 21.6 | — | ✓ | $8.2*10^{11}$ | $8.3*10^{11}$ |
| Comparative example 17 | 6 | 25.5 | 20.1 | — | ✓ | $2.3*10^{11}$ | $2.4*10^{11}$ | o smoke,
— no smoke,
✓ dense and uniform cells,
x sparse and nonuniform cells

As can be seen from Table 1 and Table 2, the HMSPP601, HMSPP602 and HMSPP603 polypropylenes prepared by the invention have high melt strength, tensile strength and flexural modulus, and higher notched impact strength.

The flame-retardant antistatic composition is prepared by taking the impact polypropylene with high melt strength, prepared by the invention as the base resin, and adding the flame retardant compounded by the complex of phosphine oxide and the transition metal salt with an inorganic hydroxide, and the carbon nanofibers or carbon nanotubes containing nickel or cobalt as the antistatic agent. Subsequently, the flame-retardant antistatic expanded beads are prepared according to the batch foaming method provided by the invention. From Table 3, Table 4 and FIGS. 4 and 5, it can be seen that the expanded beads having density of 0.07-0.21 g/cm³ can be obtained by adjusting the conditions such as foaming pressure and temperature, and when non-supercritical carbon dioxide is used as the blowing agent, the foaming effect is good, the cell density is higher, the cells are dense and uniform, the cell size is smaller, the cell walls are thin, and the bead surfaces are smooth.

From the result of Example 10, it can be seen that compared with the expanded beads taking the impact polypropylene PPSPP601, HMSPP602 and HMSPP603 with high melt strength as the base resin, the expanded beads obtained by taking the ordinary impact copolypropylene EPS30R as the base resin have higher density, nonuniform cells and not flat bead surfaces. This is mainly caused by lower melt strength of EPS30R, and the required foaming temperature is higher, resulting in higher molding pressure. Due to the above structural characteristics, the impact resistance of the foam molding of the expanded beads taking EPS30R as the base resin is inferior to that of the foam molding of the expanded beads using the impact polypropylene (e.g., HMSPP601, 602 and 603) with high melt strength provided by the invention. In addition, the molding pressure of the expanded beads obtained by using the conventional impact copolypropylene is high, and thus the production energy consumption is increased.

Table 4 shows that the foam molding prepared from the expanded beads provided according to the invention has excellent mechanical properties, flame retardancy and antistatic properties, has oxygen index higher than 28 and can be used in the field requiring higher flame-retardant level, while the surface resistivity reaches $10^8 \Omega$ antistatic level. The expanded beads have good cell structure, so that the foam molding is excellent in compressive properties. The results of the oxygen index and correlated flame retardant tests of the foam molding show that the flame retardant and the antistatic agent can play a synergistic effect, which can effectively reduce the amount of flame retardant, as evidenced by the results of Examples 1 and 7.

From the results shown in Table 4, particularly the results of Comparative Examples 2-7, it can be seen that the flame retardant such as conventional red phosphorus, brominated flame retardants, individual aluminum hydroxide or individual phosphine oxide is used in combination with carbon nanofibers containing nickel or cobalt and the like to serve as a complex flame-retardant antistatic agent for the preparation of the polypropylene composition, the flame retardancy and electrostatic resistance of the foam molding of the expanded beads prepared from such polypropylene composition are inferior to those of the foam molding of the expanded beads prepared from the compositions described in Examples 1-22, and the addition of the flame retardants and the antistatic agents in the comparative examples generates a negative effect on the foaming property, resulting in nonuniform cells and damaged cell walls.

Figure 6:
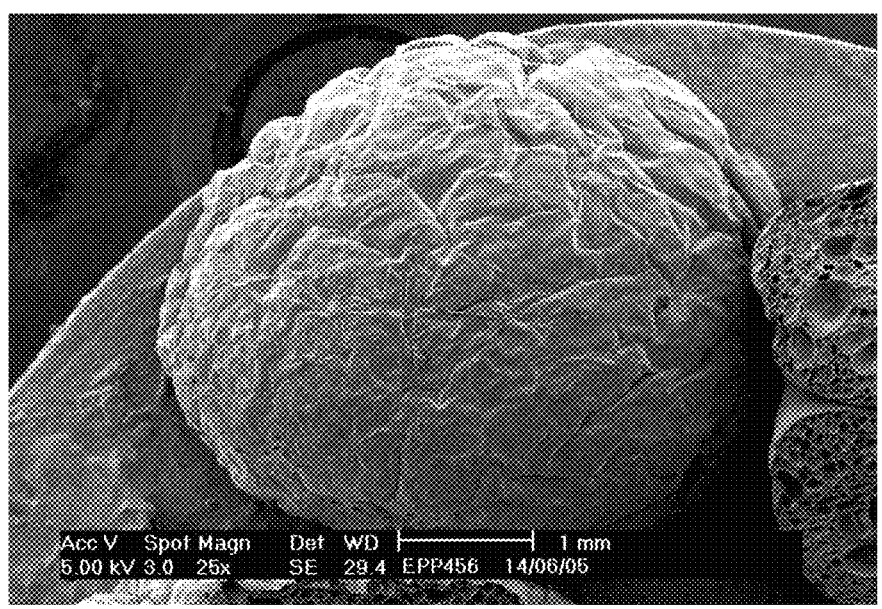
FIG. 6 shows the surface electron micrograph of the expanded polypropylene beads prepared in Comparative Example 2.
Figure 7:
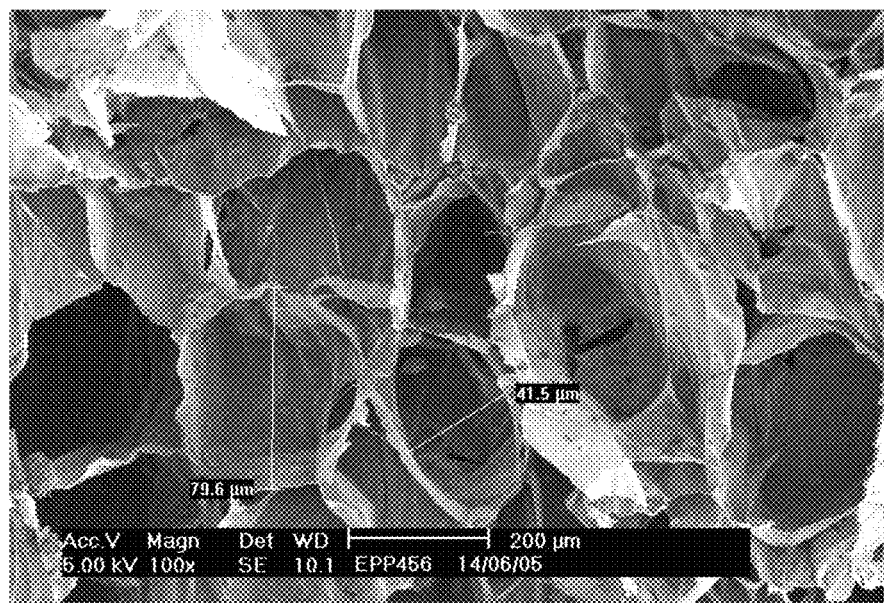
FIG. 7 shows the cross-sectional electron micrograph of the expanded polypropylene beads prepared in Comparative Example 2.

In the examples of the invention, in a flame-retardant antistatic system composed of the flame retardant compounded by the complex of organophosphorus and the transition metal such as nickel or cobalt with magnesium hydroxide or aluminum hydroxide and carbon nanofibers, the transition metal and the flame retardant generate a synergistic catalytic effect, so that the flame-retardant efficiency of the phosphorus flame retardant is improved. The carbon nanofibers can build an effective conductive network inside the resin, thereby forming a long-lasting antistatic network system, and effectively reducing the surface resistivity of the foam molding of the expanded beads, and when the storage or use time is 30 days or longer, the antistatic capability of the foam molding is almost unchanged. The residual nickel or cobalt catalyst in the carbon fibers also has a good synergistic effect with the complex to promote the improvement of flame-retardant efficiency. In Comparative Example 2, in the composition obtained by using the system formed by the conventional red phosphorus flame retardant and the antistatic agent, a synergistic effect is not generated, but the flame retardant and the antistatic agent affect each other to reduce the flame retardancy and the antistatic property, a negative effect is generated on the cell structure of the beads, and thus the resulting expanded beads have low cell density, larger cell diameter, and cell wall breakage (as shown in FIG. 6 and FIG. 7).

In addition, it can be found from Tables 3 and 4 that, in addition to being applied to the polypropylene resin, the flame retardant also has excellent mechanical properties, flame-retardant properties, foaming performance and antistatic performance when applied to polyethylene, polyester, polyamide, and degradable thermoplastic materials of various densities and comonomers.

While the invention has been described in detail, modifications within the spirit and scope of the invention will be apparent to those skilled in the art. In addition, it is to be understood that various aspects, and various parts and various recited characteristics of the various embodiments of the invention may be combined or fully or partially interchangeable. In the above embodiments, those embodiments which refer to another embodiment may be suitably combined with other embodiments, as will be understood by those skilled in the art. Furthermore, it will be understood by those skilled in the art that the foregoing description is by way of examples only and is not intended to limit the invention.

The invention claimed is:

1. A flame-retardant thermoplastic material comprising a thermoplastic base resin, a flame retardant, and an optional antioxidant, wherein the flame retardant comprises a complex of a phosphine oxide and a transition metal salt, or a complex of tributyl phosphate and a transition metal salt, or a complex of dibutyl butylphosphate and a transition metal salt, and based on 100 parts by weight of the thermoplastic base resin, the amount of the flame retardant is 5-50 parts by weight; and wherein the flame retardant further comprises a carbon nanofiber antistatic agent and the carbon nanofiber antistatic agent comprises 1-5 wt % of transition metal.

2. The flame-retardant thermoplastic material according to claim 1, characterized in that the phosphine oxide has the following structural formula I:

Formula I wherein $R_1$, $R_2$ and $R_3$, identical or different, are independently selected from $C_1$-$C_{18}$ linear alkyl, $C_3$-$C_{18}$ branched alkyl, $C_1$-$C_{18}$ linear alkoxy, $C_3$-$C_{18}$ branched alkoxy, $C_6$-$C_{20}$ substituted or unsubstituted aryl, and $C_6$-$C_{20}$ substituted or unsubstituted aryloxy.

3. The flame-retardant thermoplastic material according to claim 2, characterized in that the phosphine oxide is selected from at least one of triphenylphosphine oxide, bis(4-hydroxyphenyl) phenylphosphine oxide, bis(4-carboxyphenyl) phenylphosphine oxide, tributylphosphine oxide, trihexylphosphine oxide, trioctylphosphine oxide, and tridecylphosphine oxide.

4. The flame-retardant thermoplastic material according to claim 1, characterized in that the transition metal salt is a transition metal organic salt and/or a transition metal inorganic salt;
and/or
the step of preparing the complex comprises stirring and mixing 1-10 parts by weight of phosphine oxide, or tributyl phosphate, or dibutyl butyl phosphate with 3-15 parts by weight of transition metal salt in an organic solvent, followed by microwave heating and supercritical drying to obtain the complex.

5. The flame-retardant thermoplastic material according to claim 1, characterized in that based on 100 parts by weight of the thermoplastic base resin, the amount of the flame retardant is 10-20 parts by weight.

6. The flame-retardant thermoplastic material according to claim 5, characterized in that the flame retardant further comprises an inorganic flame retardant component; the weight ratio of the complex to the inorganic flame retardant component in the flame retardant is (1-5): 1; the inorganic flame retardant component is selected from hydroxides of the Group 2 and Group 13 metals.

7. A flame-retardant thermoplastic material comprising thermoplastic base resin, a flame retardant, and an optional antioxidant, wherein the flame retardant comprises a complex of phosphine oxide and a transition metal salt, or a complex of tributyl phosphate and a transition metal salt, or a complex of dibutyl butylphosphate and a transition metal salt, and based on 100 parts by weight of the thermoplastic base resin, the amount of the flame retardant is 5-50 parts by weight, wherein the thermoplastic base resin is a polypropylene base resin;
the polypropylene base resin comprises a propylene homopolymer component and a propylene-ethylene copolymer component and is characterized in that:
the molecular weight distribution $M_w/M_n$ is less than or equal to 10 and greater than or equal to 4; $M_{z+1}/M_w$ is greater than 10 and less than 20;
the content of room-temperature xylene-soluble matters is greater than 10% by weight and less than 30% by weight; the ratio of $M_w$ of room-temperature trichlorobenzene-soluble matters to $M_w$ of room-temperature trichlorobenzene-insoluble matters is greater than 0.4 and less than 1.

8. The flame-retardant thermoplastic material according to claim 7, characterized in that the ethylene content in the room-temperature xylene-soluble matters of the polypropylene base resin is less than 50% by weight and more than 25% by weight;
and/or,
the ethylene monomer content in the polypropylene base resin is 5-15% by weight; and/or
the polypropylene base resin has melt index of 0.1-15 g/10 min, as measured at 230° C. under a load of 2.16 kg.

9. The flame-retardant thermoplastic material according to claim 7, characterized in that the step of preparing the polypropylene base resin comprises:
(1) first step: propylene homopolymerization reaction, including:
① first stage: carrying out propylene homopolymerization reaction in the presence or absence of hydrogen under the action of a Ziegler-Natta catalyst comprising a first external electron donor to obtain a reaction stream comprising a first propylene homopolymer;
② second stage: adding a second external electron donor to have complexing reaction with the catalyst in the reaction stream and then carrying out propylene homopolymerization in the presence of the first propylene homopolymer and hydrogen to produce a second propylene homopolymer, thereby obtaining a propylene homopolymer component comprising the first propylene homopolymer and the second propylene homopolymer;
wherein the melt indices of the first propylene homopolymer and the propylene homopolymer component comprising the first propylene homopolymer and the second propylene homopolymer are 0.001-0.4 g/10 min and 0.1-15 g/10 min, respectively, as measured at 230° C. under a load of 2.16 kg; and the weight ratio of the first propylene homopolymer to the second propylene homopolymer is 40:60 to 60:40;
(2) second step: propylene-ethylene copolymerization reaction: carrying out propylene-ethylene copolymerization reaction in the presence of the propylene homopolymer component and hydrogen to produce a propylene-ethylene copolymer component, thereby obtaining the polypropylene base resin comprising the propylene homopolymer component and the propylene-ethylene copolymer component.

10. The flame-retardant thermoplastic material according to claim 9, characterized in that the weight ratio of the propylene-ethylene copolymer component to the propylene homopolymer component is 11-40:100; and/or the ratio of the melt index of the propylene homopolymer component to the melt index of the polypropylene base resin comprising the propylene homopolymer component and the propylene-ethylene copolymer component, as measured at 230° C. under a load of 2.16 kg, is greater than or equal to 0.6 and less than or equal to 1.

11. Flame-retardant thermoplastic expanded beads prepared by carrying out a batch foaming process on a material comprising 100 parts by weight of the flame-retardant thermoplastic material according to claims 1 and 0.001 to 1 part by weight of a cell nucleating agent.

12. A foam molding prepared from the expanded beads according to claim 11, having surface resistivity of $1.0*10^7 \Omega$ to $1.0*10^9 \Omega$, limiting oxygen index of 20-40, and compressive strength of 170-600 kPa.

13. The flame-retardant thermoplastic material according to claim 2, characterized in that $R_1$, $R_2$ and $R_3$ are independently selected from $C_4$-$C_{18}$ linear or branched alkyl and $C_6$-$C_{18}$ aryl having 1 or 2 carbon rings.

14. The flame-retardant thermoplastic material according to claim 2, characterized in that $R_1$, $R_2$ and $R_3$ are independently selected from $C_6$-$C_{12}$ linear or branched alkyl having 6 or more carbon atoms on the primary carbon chain and substituted or unsubstituted phenyl.

15. The flame-retardant thermoplastic material according to claim 4, characterized in that the transition metal salt is at least one of nitrate, thiocyanate, formate, acetate and oxalate of a metal element from Groups 8-10.

16. The flame retardant thermoplastic material according to claim 1, characterized in that based on 100 parts by weight of the thermoplastic base resin, the amount of the carbon nanofiber antistatic agent is 0.1-10 parts by weight.

17. The flame retardant thermoplastic material according to claim 1, characterized in that based on 100 parts by weight of the thermoplastic base resin, the amount of the carbon nanofiber antistatic agent is 1-3 parts by weight.

18. The flame-retardant thermoplastic material according to claim 1, characterized in that the thermoplastic base resin is selected from at least one of polyolefin base resin, polylactic acid base resin, polyurethane base resin, polyester base resin and polyamide base resin.

19. The flame-retardant thermoplastic material according to claim 18, characterized in that the thermoplastic base resin is selected from at least one of polyethylene base resin, polypropylene base resin, polybutylene base resin, polyurethane base resin, polylactic acid base resin, polyethylene terephthalate base resin, polybutylene terephthalate base resin, polyamide 6 base resin, and poly(butylene succinate) base resin.

20. The flame-retardant thermoplastic material according to claim 1, characterized in that the preparation step of the carbon nanofiber antistatic agent comprises: subjecting a carbon source to acid treatment and then forming a complex with a transition metal catalyst, and subjecting the complex to carbonization treatment at 800-1200° C. under the protection of inert gas.

21. The flame-retardant thermoplastic material according to claim 20, characterized in that the carbon source is selected from at least one of carbon pitch, petroleum pitch, coal tar pitch, coal tar, natural graphite, artificial graphite, bamboo charcoal, carbon black, activated carbon and graphene with carbon content of 80 wt % or higher;
the transition metal catalyst is selected from at least one of sulfate, nitrate, acetate and a menthyl compound of a transition metal; the transition metal is selected from at least one of iron, cobalt, nickel and chromium; and/or
the mass ratio of the transition metal catalyst to the carbon source is 35-70:100, based on the transition metal.

22. The flame-retardant thermoplastic material according to claim 7, characterized in that the phosphine oxide has the following structural formula I:

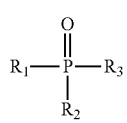

Formula I wherein $R_1$, $R_2$ and $R_3$, identical or different, are independently selected from $C_1$-$C_{18}$ linear alkyl, $C_3$-$C_{18}$ branched alkyl, $C_1$-$C_{18}$ linear alkoxy, $C_3$-$C_{18}$ branched alkoxy, $C_6$-$C_{20}$ substituted or unsubstituted aryl, and $C_6$-$C_{20}$ substituted or unsubstituted aryloxy.

23. The flame-retardant thermoplastic material according to claim 22, characterized in that the phosphine oxide is selected from at least one of triphenylphosphine oxide, bis(4-hydroxyphenyl) phenylphosphine oxide, bis(4-carboxyphenyl) phenylphosphine oxide, tributylphosphine oxide, trihexylphosphine oxide, trioctylphosphine oxide, and tridecylphosphine oxide.

24. The flame-retardant thermoplastic material according to claim 7, characterized in that the transition metal salt is a transition metal organic salt and/or a transition metal inorganic salt;
and/or,
the step of preparing the complex comprises stirring and mixing 1-10 parts by weight of phosphine oxide, or tributyl phosphate, or dibutyl butylphosphate with 3-15 parts by weight of transition metal salt in an organic solvent, followed by microwave heating and supercritical drying to obtain the complex.

25. The flame-retardant thermoplastic material according to claim 7, characterized in that based on 100 parts by weight of the thermoplastic base resin, the amount of the flame retardant is 10-20 parts by weight.

26. The flame-retardant thermoplastic material according to claim 25, characterized in that the flame retardant further comprises an inorganic flame retardant component;
wherein the weight ratio of the complex to the inorganic flame retardant component in the flame retardant is (1-5): 1, and the inorganic flame retardant component is selected from hydroxides of the Group 2 and Group 13 metals.

27. Flame-retardant thermoplastic expanded beads prepared by carrying out an batch foaming process on a material comprising 100 parts by weight of the flame-retardant thermoplastic material according to claims 7 and 0.001 to 1 part by weight of a cell nucleating agent.

28. A foam molding prepared from the expanded beads according to claim 27, having surface resistivity of $1.0*10^7\Omega$ to $1.0*10^9\Omega$, limiting oxygen index of 20-40, and compressive strength of 170-600 kPa.

29. The flame-retardant thermoplastic material according to claim 22, characterized in that $R_1$, $R_2$ and $R_3$ are independently selected from $C_4$-$C_{18}$ linear or branched alkyl and $C_6$-$C_{18}$ aryl having 1 or 2 carbon rings.

30. The flame-retardant thermoplastic material according to claim 22, characterized in that $R_1$, $R_2$ and $R_3$ are independently selected from $C_6$-$C_{12}$ linear or branched alkyl having 6 or more carbon atoms on the primary carbon chain and substituted or unsubstituted phenyl.

31. The flame-retardant thermoplastic material according to claim 24, characterized in that the transition metal salt is at least one of nitrate, thiocyanate, formate, acetate and oxalate of a metal element from Groups 8-10.

* * * * *